United States Patent
Ajiro et al.

(10) Patent No.: US 9,707,847 B2
(45) Date of Patent: Jul. 18, 2017

(54) BRAKING CONTROL DEVICE AND CONTROL METHOD

(71) Applicant: NISSAN MOTOR CO., LTD., Yokohama-shi, Kanagawa (JP)

(72) Inventors: Keigo Ajiro, Isehara (JP); Kensuke Nakamura, Isehara (JP); Takuya Higuchi, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/384,515

(22) PCT Filed: Mar. 7, 2013

(86) PCT No.: PCT/JP2013/056252
§ 371 (c)(1),
(2) Date: Sep. 11, 2014

(87) PCT Pub. No.: WO2013/137098
PCT Pub. Date: Sep. 19, 2013

(65) Prior Publication Data
US 2015/0032353 A1    Jan. 29, 2015

(30) Foreign Application Priority Data

Mar. 14, 2012   (JP) .................................. 2012-057744

(51) Int. Cl.
*B60L 7/26*       (2006.01)
*B60T 13/58*    (2006.01)
(Continued)

(52) U.S. Cl.
CPC    *B60L 7/26* (2013.01); *B60L 7/14* (2013.01); *B60L 11/14* (2013.01);
(Continued)

(58) Field of Classification Search
CPC .... B60T 13/586; B60T 2270/604; B60L 7/26; B60L 15/2009
(Continued)

(56) References Cited

U.S. PATENT DOCUMENTS 5,967,621 A  * 10/1999  Ito ............................. B60L 7/10
                                                                    303/15
8,500,213 B2    8/2013  Ohtani et al.
(Continued)

FOREIGN PATENT DOCUMENTS

EP          2 213 539 A1      8/2010
JP          10-329681 A    * 12/1998
(Continued)

OTHER PUBLICATIONS

Mentor Products Inc., "The Laws of Algebra" web page, Google date: Mar. 1, 2003, 3 pages, downloaded from http://mentorproducts.com/laws2.html.*
(Continued)

*Primary Examiner* — Behrang Badii
*Assistant Examiner* — David Testardi
(74) *Attorney, Agent, or Firm* — Foley & Lardner LLP

(57) ABSTRACT

A hybrid vehicle includes a braking device configured to apply a frictional braking torque to a vehicle wheel in response to movement of an input member of a brake pedal, an electric motor configured to apply a regenerative braking torque to the vehicle wheel, and a control unit. During braking, the control unit is configured to determine a limit value of the regenerative braking torque that can be generated in accordance with an operating condition of the charging device or the electric motor, and reduce a ratio of the regenerative braking torque to the frictional braking torque before the regenerative braking torque reaches the limit value.

5 Claims, 14 Drawing Sheets

(51) Int. Cl.
*B60L 7/14* (2006.01)
*B60L 11/14* (2006.01)
*B60L 15/20* (2006.01)
*B60T 1/10* (2006.01)
*B60T 7/04* (2006.01)
*B60T 13/66* (2006.01)
*B60T 8/17* (2006.01)
*B60W 30/18* (2012.01)

(52) U.S. Cl.
CPC ............ *B60L 15/2009* (2013.01); *B60T 1/10* (2013.01); *B60T 7/042* (2013.01); *B60T 8/17* (2013.01); *B60T 13/586* (2013.01); *B60T 13/662* (2013.01); *B60W 30/18127* (2013.01); *B60L 2210/30* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/425* (2013.01); *B60L 2240/441* (2013.01); *B60L 2240/443* (2013.01); *B60L 2240/445* (2013.01); *B60L 2240/545* (2013.01); *B60T 2270/604* (2013.01); *Y02T 10/645* (2013.01); *Y02T 10/70* (2013.01); *Y02T 10/7077* (2013.01); *Y02T 10/7241* (2013.01); *Y02T 10/7275* (2013.01)

(58) Field of Classification Search
USPC .......................................................... 701/70
See application file for complete search history.

(56) References Cited

U.S. PATENT DOCUMENTS

| | | | | |
|---|---|---|---|---|
| 8,573,709 B2 * | 11/2013 | Suzuki | .................... | B60L 3/108 303/151 |
| 8,670,914 B2 * | 3/2014 | Fujiki | ...................... | B60T 1/10 701/70 |
| 8,931,856 B2 * | 1/2015 | Okano | ..................... | B60T 1/10 303/15 |
| 9,002,609 B2 * | 4/2015 | Nakamura | ................ | B60T 1/10 180/271 |
| 2005/0269875 A1 * | 12/2005 | Maki | ......................... | B60L 7/26 303/152 |
| 2009/0115242 A1 | 5/2009 | Ohtani et al. | | |
| 2009/0118888 A1 * | 5/2009 | Minarcin | .................. | B60K 6/26 701/22 |
| 2011/0066345 A1 | 3/2011 | Nasu et al. | | |
| 2011/0251770 A1 * | 10/2011 | Minarcin | .................. | B60T 1/10 701/71 |
| 2011/0285198 A1 * | 11/2011 | Nakata | ................... | B60K 6/445 303/3 |
| 2012/0074767 A1 * | 3/2012 | Nishio | ..................... | B60T 1/10 303/3 |
| 2012/0074768 A1 * | 3/2012 | Naito | ....................... | B60T 1/10 303/3 |
| 2012/0158266 A1 * | 6/2012 | Miyazaki | ................. | B60L 7/18 701/70 |
| 2013/0291534 A1 | 11/2013 | Ohtani et al. | | |

FOREIGN PATENT DOCUMENTS

| | | | |
|---|---|---|---|
| JP | 2007-112426 A | | 5/2007 |
| JP | 2010114978 A | * | 5/2010 |
| JP | 2010-179742 A | | 8/2010 |
| JP | 2010269642 A | * | 12/2010 |
| JP | 2011056969 A | * | 3/2011 |
| JP | 2011115002 A | * | 6/2011 |
| WO | WO-2011/132074 A2 | | 10/2011 |
| WO | WO-2011/154801 A1 | | 12/2011 |

OTHER PUBLICATIONS

JPO machine translation of JP 2011-115002 (original JP document published Jun. 9, 2011).*

* cited by examiner

BRAKING CONTROL DEVICE AND CONTROL METHOD

TECHNICAL FIELD

The present invention relates to a braking control device that reduces a speed of a vehicle using an electric motor.

BACKGROUND ART

A conventional braking control device calculates a degree of variation in a depression force representing an amount of variation in a brake pedal reaction force on the basis of an amount of displacement of an input rod of the brake pedal, and steadily limits an amount of variation in a regenerative braking torque applied to a vehicle wheel as the degree of variation in the depression force increases (see JP2010-179742A, JP2007-112426A).

SUMMARY OF INVENTION

When a brake operation is performed in the conventional braking control device described above, however, an increase rate of the regenerative braking torque may vary rapidly due to an output characteristic of an electric motor and a reception limitation of a battery. Accordingly, the brake pedal reaction force may also vary rapidly, causing a driver to experience discomfort.

The present invention has been designed in consideration of this problem in the related art, and an object thereof is to provide a braking control device and control method with which rapid variation in a brake pedal reaction force during vehicle braking is suppressed.

A braking control device according to the present invention includes a frictional braking device configured to apply a frictional braking torque to a vehicle wheel in response to movement of an input member of a brake pedal, an electric motor configured to apply a regenerative braking torque to the vehicle wheel; and a charging device configured to be charged with regenerative power generated by the electric motor. The braking control device further includes a detection unit configured to detect a displacement amount of the input member, and a control unit configured to determine a required braking torque of a driver on the basis of the displacement amount detected by the detection unit, and allocate the required braking torque to the regenerative braking torque and the frictional braking torque. The control unit is configured to determine a limit value of the regenerative braking torque that can be generated in accordance with an operating condition of the charging device or the electric motor, and reduce a proportion of the regenerative braking torque in the required braking torque after the detection unit detects the displacement amount of the input member and before the regenerative braking torque reaches the limit value.

Embodiments and advantages of the present invention will be described in detail below with reference to the attached figures.

DESCRIPTION OF EMBODIMENTS

First Embodiment

Figure 1:
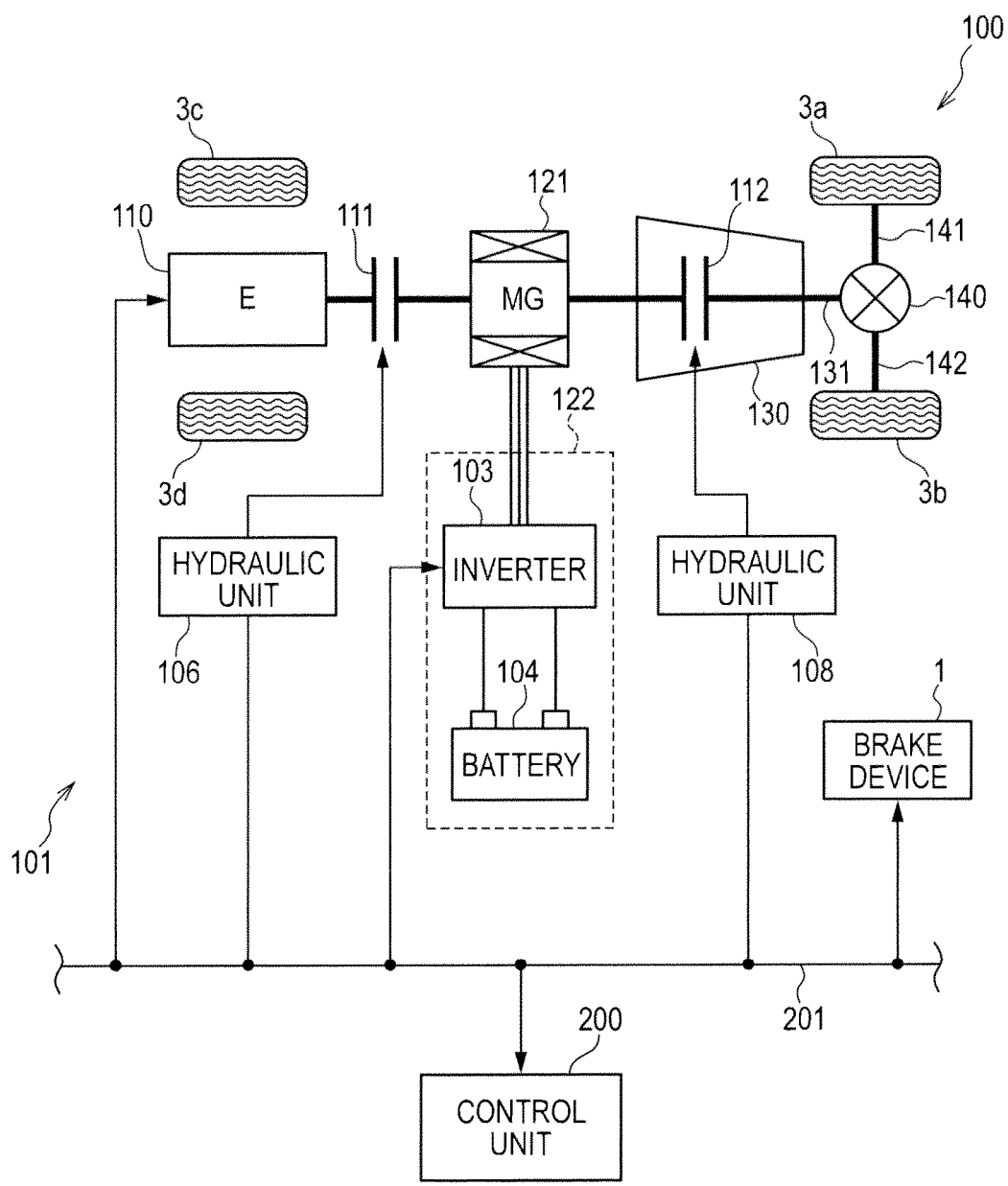
FIG. 1 is a circuit diagram showing a hybrid vehicle according to a first embodiment of the present invention.

FIG. 1 is a view showing an overall configuration of a hybrid vehicle according to a first embodiment of the present invention.

A hybrid vehicle 100 is constituted by a drive unit 101 that drives the hybrid vehicle 100, and a control unit 200 that controls the drive unit 101.

The drive unit 101 includes vehicle wheels 3a to 3d attached to a vehicle body, an engine 110 serving as a power source of the hybrid vehicle 100, and a motor/generator 121 that regenerates inertial energy of the vehicle body when braking is applied to the vehicle body.

The drive unit 101 also includes a charging device 122 that is charged with regenerative power generated by the motor/generator 121 when braking is applied to the vehicle body. The charging device 122 includes a battery 104 that stores drive power for driving the motor/generator 121, and an inverter 103 that controls the supply of power between the motor/generator 121 and the battery 104.

The drive unit 101 further includes a clutch 111 that transmits power from the engine 110 to an input shaft of the motor/generator 121, a hydraulic unit 106 that drives the clutch 111, and an automatic transmission 130 provided on an output shaft of the motor/generator 121. The automatic transmission 130 includes a clutch 112 that transmits power from the output shaft of the motor/generator 121 to a propeller shaft 131.

Furthermore, the drive unit 101 includes a hydraulic unit 108 that drives the clutch 112, a differential 140 coupled to the propeller shaft 131, and a left drive shaft 141 and a right drive shaft 142 coupled to the differential 140. The drive unit 101 also includes a brake device 1 that applies a frictional braking torque to the vehicle wheels 3a to 3d in response to a brake operation performed by a driver.

The engine 110 is the power source that causes the hybrid vehicle 100 to travel. The engine 110 is realized by a gasoline engine, for example.

The clutches 111 and 112 are normally closed dry clutches that are fully engaged by a biasing force of a plate spring. Multiplate wet clutches in which an oil flow and an oil pressure can be controlled continuously using a proportional solenoid, for example, may be used as the clutches 111 and 112.

The hydraulic unit 106 drives the clutch 111 to set an output shaft of the engine 110 and the input shaft of the motor/generator 121 in an engaged condition or a disengaged condition. The hydraulic unit 108 drives the clutch 112 to switch the output shaft of the motor/generator 121 and an input shaft of the propeller shaft 131 between three conditions, namely a fully engaged condition, a slip engagement condition, and a disengaged condition.

The inverter 103 is a current converter that performs conversions between two types of electricity, namely a direct current and an alternating current. The inverter 103 converts a direct current from the battery 104 into a three phase alternating current having a desired frequency, and supplies the three phase alternating current to the motor/generator 121 so that a motor torque reaches a target motor torque. When the motor/generator 121 functions as a power generator, on the other hand, the inverter 103 converts a three phase alternating current from the motor/generator 121 into a direct current, and supplies the direct current to the battery 104.

The motor/generator 121 is a synchronous electric motor formed by burying a permanent magnet in a rotor and winding a coil around a stator. When braking is applied to the hybrid vehicle 100, the motor/generator 121 applies a regenerative braking torque to the vehicle wheels 3a to 3d. The regenerative braking torque is a part of a braking torque applied to the vehicle wheels 3a to 3d that is used by the motor/generator 121 to generate power.

The motor/generator 121 is controlled by a supply of a three phase alternating current from the inverter 103. Upon reception of a supply of power from the battery 104, the motor/generator 121 functions as a motor so as to drive the rotor to rotate. Further, when the rotor is rotated by an external force, the motor/generator 121 functions as a power generator such that an electromotive force is generated in respective ends of the stator coil. Regenerative power generated by the motor/generator 121 is charged to the battery 104.

The automatic transmission 130 is a transmission that switches automatically between speed proportions corresponding to five forward speeds and one reverse speed or the like in accordance with a vehicle speed VSP, an accelerator opening APO, and so on.

The differential 140 applies power from an output shaft of the automatic transmission 130 respectively to the vehicle wheel 3a, which is coupled to the left drive shaft 141, and a vehicle wheel 3b, which is coupled to the right drive shaft 142.

The brake device 1 detects an operation amount of the brake operation performed by the driver, and increases the frictional braking torque applied to the vehicle wheels 3a to 3d as the detected operation amount increases. The brake device 1 receives a regenerative cooperation control command including a value (referred to hereafter as a "regeneration command value") of the regenerative braking torque from the control unit 200. Upon reception of the regenerative cooperation control command, the brake device 1 applies a frictional braking torque obtained by subtracting an amount of regenerative braking torque corresponding to the regeneration command value from a required braking torque corresponding to the brake operation performed by the driver to the vehicle wheels 3a to 3d.

The control unit 200 is a braking control device that controls travel by and braking of the hybrid vehicle 100. The control unit 200 is capable of switching a travel condition of the hybrid vehicle 100 between three travel modes.

To set the travel condition to an electric vehicle travel mode (referred to hereafter as an "EV travel mode") in which travel is performed using the power of the motor/generator 121 alone, the control unit 200 controls the clutch 111 to the disengaged condition and controls the clutch 112 to the engaged condition.

To set the travel condition to an engine use travel mode (referred to hereafter as an "HEV travel mode") in which the vehicle is caused to travel using power from both the motor/generator 121 and the engine 110, the control unit 200 controls both the clutch 111 and the clutch 112 to the engaged condition.

The control unit 200 also sets the travel condition to an engine use slip travel mode (referred to hereafter as a "WSC travel mode") in which the vehicle is caused to travel while causing the power of the motor/generator 121 and the engine 110 to slip. At this time, the control unit 200 controls the clutch 111 to the engaged condition and controls the clutch 112 to the slip engagement condition. The WSC travel mode is set particularly when creep travel is possible, for example when a state of charge (SOC) of the battery 104 is low or a temperature of cooling water in the engine 110 is low.

The HEV travel mode is further divided into three more travel modes, namely an engine travel mode, a motor assist travel mode, and a travel power generation mode.

In the engine travel mode, the control unit 200 rotates the vehicle wheels 3a and 3b using only the power of the engine 110. In the motor assist travel mode, the control unit 200 rotates the vehicle wheels 3a and 3b using power from both the motor/generator 121 and the engine 110.

In the travel power generation mode, the control unit 200 rotates the vehicle wheels 3a and 3b using the power of the engine 110 alone, and drives the motor/generator 121 as a power generator. The travel condition is set to the travel power generation mode during a constant speed operation or an acceleration operation, for example. Further, during a deceleration operation, the motor/generator 121 converts braking energy generated by the vehicle wheels 3a and 3b into regenerative power and charges the regenerative power to the battery 104.

The control unit 200 has a function for managing an overall energy consumption of the vehicle to ensure that the vehicle travels at maximum efficiency. For example, the control unit 200 adjusts a rotation speed Ne and a torque T of the engine 110 to an optimum engine operating point. Further, the control unit 200 adjusts a rotation speed Nm and a torque Tm of the motor/generator 121 to an optimum motor operating point.

The control unit 200 receives condition information from the engine 110, the motor/generator 121, the charging device 122, the clutch 111, the clutch 112, and the brake device 1 via a CAN (Controller Area Network) communication line 201. The control unit 200 uses the condition information to determine target operating conditions of the engine 110, the clutch 111, the clutch 112, the motor/generator 121, and the brake device 1.

Further, when braking is applied to the hybrid vehicle 100, the control unit 200 determines the required braking torque of the driver on the basis of the brake operation amount detected by the brake device 1. The control unit 200 then allocates the required braking torque to the regenerative braking torque and the frictional braking torque. In this embodiment, the control unit 200 allocates the required braking torque preferentially to the regenerative braking torque, and increases the proportion of the frictional braking torque when the required braking torque cannot be satisfied by the regenerative braking torque alone.

More specifically, the control unit 200 sets a value of the required braking torque as the regeneration command value of the regenerative braking torque, controls the inverter 103 such that the regenerative braking torque is applied to the vehicle wheels 3a and 3b by the motor/generator 121, and transmits the regenerative cooperation control command including the regeneration command value to the brake device 1. When the required braking torque required in accordance with the brake operation performed by the driver is not satisfied by the regenerative braking torque alone, the brake device 1 applies frictional braking torque to the vehicle wheels 3a to 3d. In other words, when the braking torque is not satisfied by vehicle body deceleration using the regenerative braking torque alone, the control unit 200 controls the brake device 1 to compensate for the deficiency using the frictional braking torque.

Figure 2:
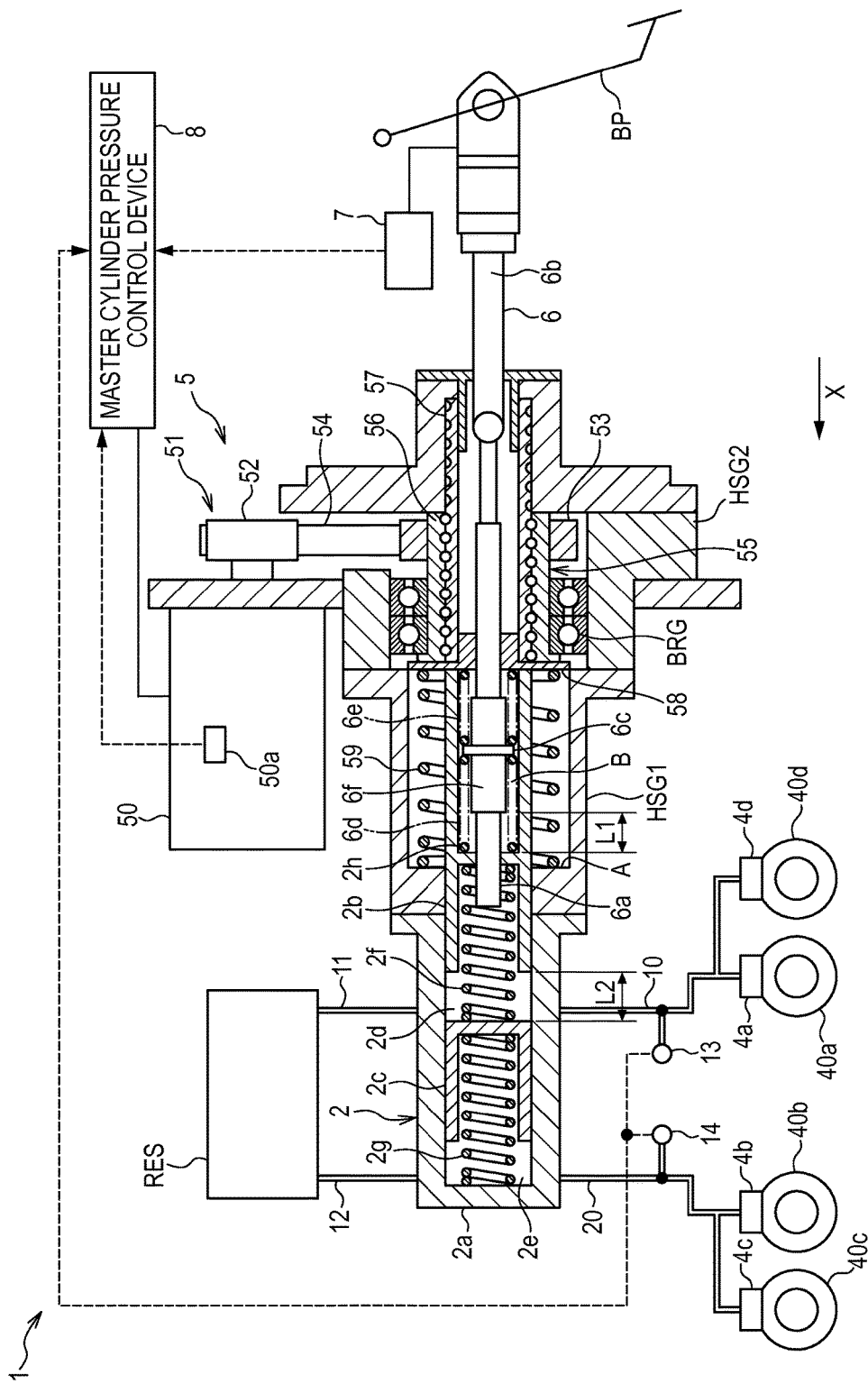
FIG. 2 is a view showing a configuration of a brake device of the hybrid vehicle.

FIG. 2 is a structural diagram showing a configuration of the brake device 1 in detail.

The brake device 1 includes wheel cylinders 4a to 4d that apply braking respectively to the vehicle wheels 3a to 3d, a master cylinder 2 that supplies working oil to the wheel cylinders 4a to 4d, and a reservoir tank RES storing the working oil. The brake device 1 also includes an input rod 6 that advances and retreats in response to an operation of a brake pedal BP, and a master cylinder pressure control mechanism 5 that boosts a propulsion force applied to the input rod 6. The brake device 1 further includes a brake operation amount detection device 7 that detects a displacement amount of the input rod 6, and a master cylinder pressure control device 8 that controls the master cylinder pressure control mechanism 5 in accordance with the displacement amount detected by the brake operation amount detection device 7.

The input rod 6 is an input member that strokes (advances and retreats) together with the brake pedal BP. When the input rod 6 strokes, a primary piston 2b of the master cylinder 2 moves.

The master cylinder 2 causes the primary piston 2b, which serves as an assist member of the input rod 6, to advance and retreat.

The master cylinder pressure control mechanism 5 applies an amount of propulsion to the primary piston 2b in accordance with the movement of the input rod 6, and boosts an internal fluid pressure (referred to hereafter as a master cylinder pressure Pmc) of the master cylinder 2 using a corresponding propulsion force. In other words, the master cylinder pressure control mechanism 5 is a brake boosting device that generates boosted brake fluid in the master cylinder 2.

The brake operation amount detection device 7 is provided on an end portion 6b side of the input rod 6. The brake operation amount detection device 7 is a detection unit that detects the displacement amount of the stroke of the input rod 6 as the operation amount of the brake operation performed by the driver. The brake operation amount detection device 7 outputs a detection signal corresponding to the detected displacement amount to the master cylinder pressure control device 8.

The master cylinder pressure control device 8 receives the detection signal from the brake operation amount detection device 7, and transmits displacement amount information indicating the displacement amount of the stroke of the input rod 6 corresponding to the detection signal to the control unit 200. The master cylinder pressure control device 8 drives the master cylinder pressure control mechanism 5 in response to a control command from the control unit 200 such that a propulsion force corresponding to the displacement amount of the input rod 6 is applied to the primary piston 2b.

In the following description, an axial direction of the master cylinder 2 is defined as an x axis direction, a bottom portion side of the master cylinder 2 is defined as an x axis positive direction, and a brake pedal BP side is defined as an x axis negative direction.

The master cylinder 2 is a so-called tandem cylinder. The primary piston 2b serving as the assist member and a secondary piston 2c are provided in a cylinder 2a of the master cylinder 2.

A primary fluid pressure chamber 2d serving as a first fluid pressure chamber is formed in the cylinder 2a by an x axis positive direction side end surface of the primary piston 2b and an x axis negative direction side end surface of the secondary piston 2c. The primary fluid pressure chamber 2d is connected communicably to a primary circuit 10.

A capacity of the primary fluid pressure chamber 2d varies as the primary piston 2b and the secondary piston 2c stroke through the cylinder 2a. A return spring 2f that biases the primary piston 2b to the x axis negative direction side is disposed in the primary fluid pressure chamber 2d.

Further, a secondary fluid pressure chamber 2e serving as a second fluid pressure chamber is formed in the cylinder 2a by an inner bottom surface of the cylinder 2a and an x axis positive direction side end surface of the secondary piston 2c. The secondary fluid pressure chamber 2e is connected communicably to a secondary circuit 20.

A capacity of the secondary fluid pressure chamber 2e varies as the secondary piston 2c strokes through the cylinder 2a. A return spring 2g that biases the secondary piston 2c to the x axis negative direction side is disposed in the secondary fluid pressure chamber 2e.

A primary fluid pressure sensor 13 is provided in the primary circuit 10. To adjust the frictional braking torque, the fluid pressure sensor 13 detects a fluid pressure in the primary fluid pressure chamber 2d, and transmits fluid pressure information indicating a detection result to the master cylinder pressure control device 8.

A secondary fluid pressure sensor 14 is provided in the secondary circuit 20. To adjust the frictional braking torque, the fluid pressure sensor 14 detects a fluid pressure in the secondary fluid pressure chamber 2e, and transmits fluid pressure information indicating a detection result to the master cylinder pressure control device 8. Although not shown in the figures, the primary circuit 10 and the secondary circuit 20 are provided with various valves, a motor pump, a reservoir, and so on in order to implement ABS control and the like.

An x axis positive direction side end portion 6a of the input rod 6 penetrates a partition wall 2h of the primary piston 2b so as to be grounded within the primary fluid pressure chamber 2d. A seal is formed between the end portion 6a of the input rod 6 and the partition wall 2h of the primary piston 2b to secure water-tightness, and the end portion 6a is provided to be capable of sliding in the axial direction relative to the partition wall 2h.

The x axis negative direction side end portion 6b of the input rod 6, meanwhile, is coupled to the brake pedal BP. When the driver presses the brake pedal BP, the input rod 6 moves to the x axis positive direction side, and when the driver returns the brake pedal BP, the input rod 6 moves to the x axis negative direction side.

Further, a large diameter portion 6f having a smaller diameter than an outer diameter of a flange portion 6c and a larger diameter than an inner periphery of the partition wall 2h of the primary piston 2b is formed on the input rod 6. When the brake operation is not performed such that the brake is inactive, a gap L1 is provided between an x axis positive direction side end surface of the large diameter portion 6f and an x axis negative direction side end surface of the partition wall 2h. The primary piston 2b can move relative to the input rod 6 in the x axis negative direction through the gap L1. As a result, upon reception of the regenerative cooperation control command from the control unit 200, the master cylinder pressure control device 8 can reduce the frictional braking torque by an amount corresponding to the regenerative braking torque.

Further, when the input rod 6 displaces through the gap L1 relative to the primary piston 2b in the x axis positive direction by an amount corresponding to the gap L1, the x axis positive direction side end surface of the large diameter portion 6f and the partition wall 2h come into contact such that the input rod 6 and the primary piston 2b move integrally. As a result, working fluid in the primary fluid pressure chamber 2d is pressurized such that pressurized working fluid is supplied to the primary circuit 10.

The secondary piston 2c is moved to the x axis positive direction side by the pressure in the primary fluid pressure chamber 2d. As a result, working fluid in the secondary fluid pressure chamber 2e is pressurized such that pressurized working fluid is supplied to the secondary circuit 20.

Furthermore, the wheel cylinders 4a to 4d are frictional braking devices for applying the frictional braking torque to the vehicle wheels 3a to 3d. The wheel cylinders 4a to 4d respectively press disc rotors 40a to 40d.

The wheel cylinder 4a includes a cylinder, a piston, a pad, and so on. In the wheel cylinder 4a, the piston is moved by working fluid from the cylinder 2a, whereupon the pad, which is coupled to the piston, presses the disc rotor 40a. The wheel cylinders 4a to 4d are all configured identically.

The disc rotors 40a to 40d are attached respectively to the vehicle wheels 3a to 3d so as to rotate integrally with the vehicle wheels 3a to 3d. A braking torque acting on the disc rotors 40a to 40d serves as a braking force acting between the vehicle wheels and a road surface.

The reservoir tank RES includes at least two fluid chambers separated by a partition wall, not shown in the figure. One fluid chamber of the reservoir tank RES is connected communicably to the primary fluid pressure chamber 2d of the master cylinder 2 via a brake circuit 11. The other fluid chamber is connected communicably to the secondary fluid pressure chamber 2e via a brake circuit 12.

Next, an operation of the master cylinder pressure control mechanism 5 will be described.

The master cylinder pressure control mechanism 5 adjusts the displacement amount of the primary piston 2b, or in other words the master cylinder pressure Pmc, in accordance with a control command from the master cylinder pressure control device 8. The master cylinder pressure control mechanism 5 includes a drive motor 50 that generates a rotary force corresponding to the displacement amount of the input rod 6, a deceleration device 51 that increases the rotary force of the drive motor 50, and a rotation-translation conversion device 55 that transmits the rotary force of the deceleration device 51 to the master cylinder 2.

The drive motor 50 is a three phase DC (Direct Current) brushless motor. The drive motor 50 generates a rotary torque corresponding to the detection signal from the brake operation amount detection device 7 in response to a control command from the master cylinder pressure control device 8. The drive motor 50 serves as an actuator for causing the primary piston 2b to advance and retreat.

The deceleration device 51 decelerates an output rotation of the drive motor 50 using a pulley deceleration system. The deceleration device 51 includes a small diameter drive side pulley 52 provided on an output shaft of the drive motor 50, a large diameter driven side pulley 53 provided on a ball screw nut 56 of the rotation-translation conversion device 55, and a belt 54 wound around the drive side pulley 52 and the driven side pulley 53.

The deceleration device 51 amplifies the rotary torque of the drive motor 50 in accordance with a speed reduction proportion determined by a radius proportion between the drive side pulley 52 and the driven side pulley 53, and transmits the amplified torque to the rotation-translation conversion device 55.

The rotation-translation conversion device 55 converts rotary power of the drive motor 50 into translational power, and presses the primary piston 2b using the translational power. The rotation-translation conversion device 55 employs a ball screw system, and includes the ball screw nut 56, a ball screw shaft 57, a movable member 58, and a return spring 59.

A housing member HSG1 is provided on the x axis negative direction side of the master cylinder 2, and a housing member HSG2 is provided on the x axis negative direction side of the housing member HSG1. The ball screw nut 56 is disposed to be capable of axial rotation on an inner periphery of a bearing BRG provided in the housing member HSG2.

The ball screw nut 56 is fitted to the driven side pulley 53. The hollow ball screw shaft 57 is screwed into the ball screw nut 56. A plurality of balls are disposed to be capable of rotating and moving in a gap between the ball screw nut 56 and the ball screw shaft 57.

The movable member 58 is provided integrally with an x axis positive direction side end portion of the ball screw shaft 57, and the primary piston 2b is joined to an x axis positive direction side end surface of the movable member 58. The primary piston 2b is housed in the housing member HSG1. An x axis positive direction side end portion of the primary piston 2b projects from the housing member HSG1 and is fitted to an inner periphery of the master cylinder 2.

The return spring 59 is disposed between an inner periphery of the housing member HSG1 and an outer periphery of the primary piston 2b. An x axis positive direction side end portion of the return spring 59 is fixed to an x axis positive direction side inner bottom surface A of the housing member HSG1, and an x axis negative direction side end portion thereof is engaged to the movable member 58. The return spring 59 is disposed between the bottom surface A and the movable member 58 so as to be compressed in the axial direction, and biases the movable member 58 and the ball screw shaft 57 to the x axis negative direction side.

When the driven side pulley 53 rotates, the ball screw nut 56 rotates integrally therewith, and in accordance with the rotary motion of the ball screw nut 56, the ball screw shaft 57 performs a translational motion in the axial direction. The primary piston 2b is pressed to the x axis positive direction side via the movable member 58 by thrust generated when the ball screw shaft 57 performs a translational motion to the x axis positive direction side. Note that FIG. 2 shows a condition in which the brake is inactive and the ball screw shaft 57 is displaced by a maximum amount to the x axis negative direction side. This condition serves as an initial position of the ball screw shaft 57.

Meanwhile, an elastic force of the return spring 59 acts on the ball screw shaft 57 in an opposite direction (toward the x axis negative direction side) to the thrust of the translational motion. The elastic force acts on the x axis negative direction side likewise when a brake operation is underway, for example, or in other words even in a condition where the primary piston 2b is pressed to the x axis positive direction side such that the master cylinder pressure Pmc is increased.

Further, a pair of springs 6d and 6e are disposed in an annular space B defined between the input rod 6 and the primary piston 2b. One end of the spring 6d is latched to the flange portion 6c provided on the input rod 6, and another end of the spring 6d is latched to the partition wall 2h of the primary piston 2b. One end of the spring 6e is latched to the flange portion 6c, and another end of the spring 6e is latched to the movable member 58.

The springs 6d and 6e bias the input rod 6 relative to the primary piston 2b toward a neutral position of relative displacement between the two, and thereby serve to hold the input rod 6 and the primary piston 2b in the neutral position of relative movement when the brake is inactive. When the input rod 6 and the primary piston 2b are displaced relative to each other from the neutral position in either direction, the springs 6d and 6e apply a biasing force to return the input rod 6 to the neutral position relative to the primary piston 2b.

When the regenerative braking torque is applied to the vehicle wheels 3a and 3b by the motor/generator 121, as described above, the brake device 1 applies frictional braking torque from which an amount corresponding to the regenerative braking torque has been subtracted to the vehicle wheels 3a to 3d.

Further, the input rod 6 is configured to move in conjunction with the brake pedal BP so as to pressurize the primary fluid pressure chamber 2d, and therefore a force corresponding to the master cylinder pressure Pmc acts on the brake pedal BP via the input rod 6 and is transmitted to the driver as a brake pedal reaction force. When the regenerative braking torque is applied to the vehicle wheels 3 and 3b, therefore, the brake pedal reaction force may vary rapidly.

Figure 3:
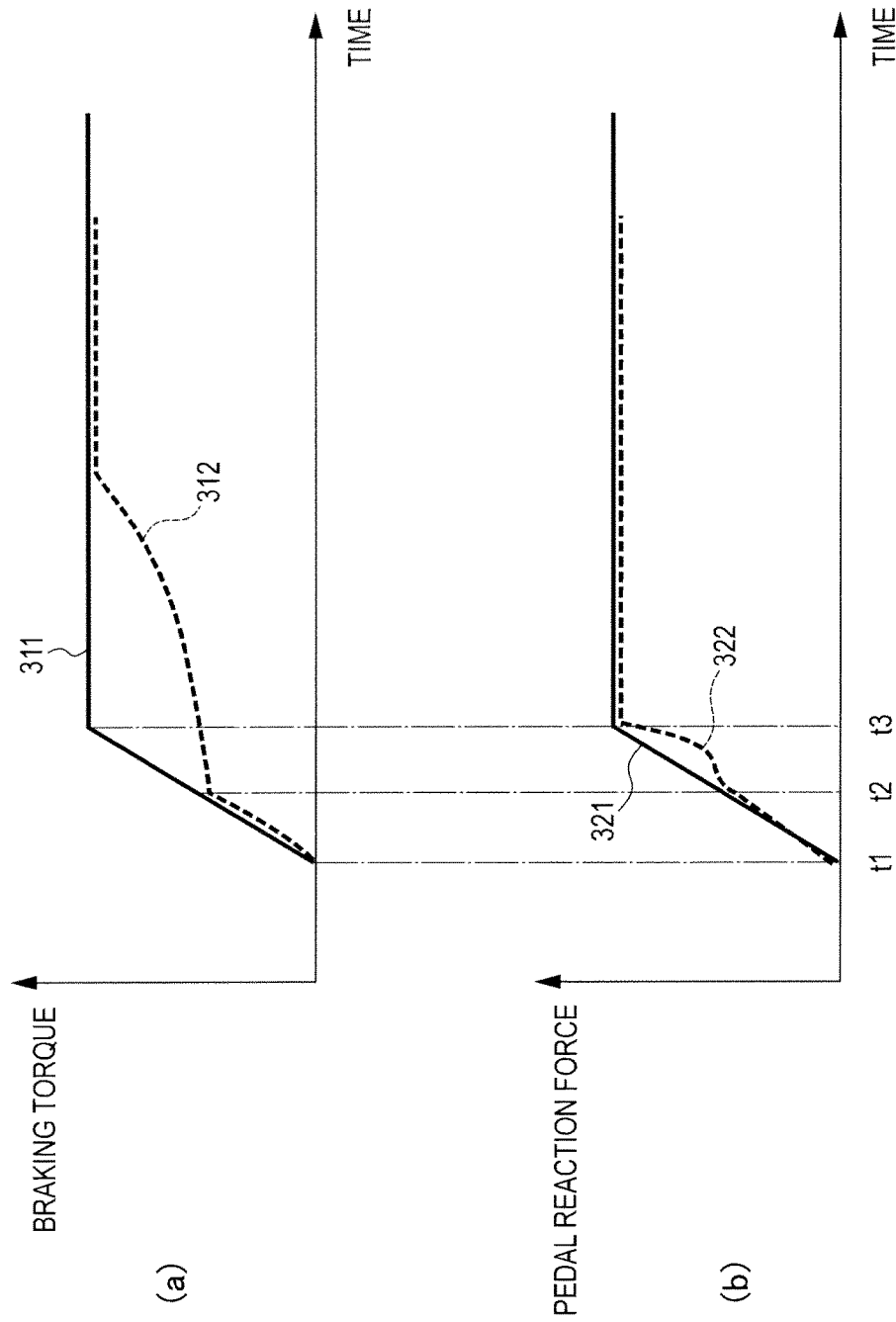
FIG. 3 is a view showing rapid variation in a brake pedal reaction force during braking.

FIG. 3 is a view showing an example of rapid variation in the brake pedal reaction force during braking. FIG. 3A is a view showing variation 312 in an increase rate of the regenerative braking torque during braking, and FIG. 3B is a view showing rapid variation 322 in the brake pedal reaction force due to the variation 312 in the regenerative braking torque. In both FIGS. 3A and 3B, the abscissa is a temporal axis.

As shown in FIG. 3A, the regenerative braking torque 312 increases in alignment with the required braking torque 311 of the driver over a period extending from a time t1 to a time t2. From t2 onward, however, the regenerative braking torque 312 increases at a lower increase rate than the required braking torque 311. The reason for this is that the regenerative braking torque that can be generated by the motor/generator 121 is limited by an output characteristic of the motor/generator 121, a power reception limitation of the battery 104, and so on.

As shown in FIG. 3B, when the regenerative braking torque is limited, an actual brake pedal reaction force 322 varies more rapidly between the time t2 and a time t3 than a brake pedal reaction force 321 at which the driver is unlikely to experience discomfort. Hence, it is assumed that the driver experiences discomfort. In response to this problem, the control unit 200 executes reaction force variation suppression processing to suppress variation in the brake pedal reaction force when the regenerative braking torque is applied to the vehicle wheels 3a and 3b.

In the reaction force variation suppression processing, the control unit 200 determines a limit value of the regenerative braking torque that can be generated by the motor/generator 121 in accordance with operating conditions of the motor/generator 121 and the charging device 122. The control unit 200 then reduces a proportion of the regenerative braking torque in the required braking torque before the regenerative braking torque reaches the limit value. In so doing, rapid variation in the amount by which the regenerative braking torque increases in the vicinity of the limit value of the regenerative braking torque is suppressed.

Figure 4:
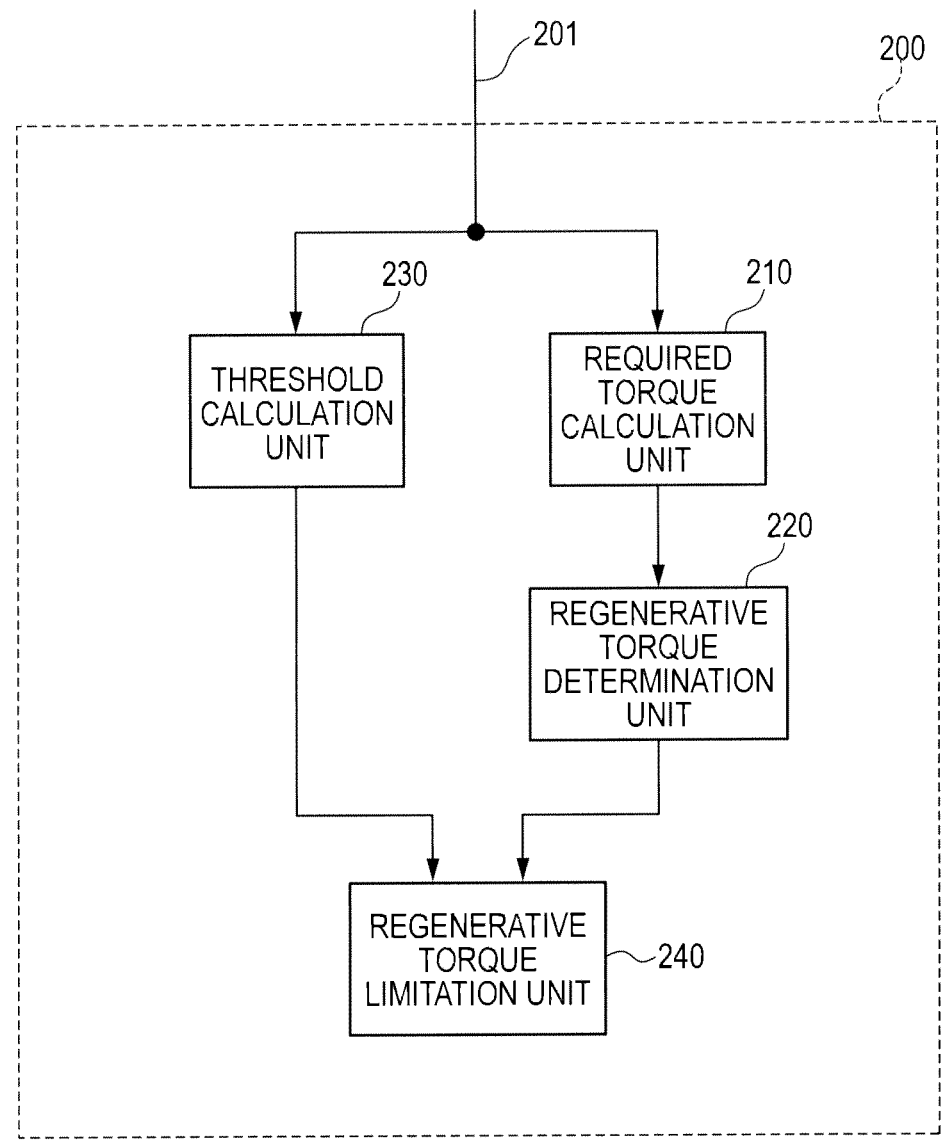
FIG. 4 is a functional block diagram showing a configuration of a control unit.

FIG. 4 is a functional block diagram showing the configuration of the control unit 200 in detail.

The control unit 200 includes a required torque calculation unit 210 that calculates the required braking torque of the driver, a regenerative torque determination unit 220 that determines an upper limit value of the regenerative braking torque in accordance with the required braking torque, and a threshold calculation unit 230 that calculates a modification threshold in relation to the increase rate of the regenerative braking torque. The control unit 200 also includes a regenerative torque limitation unit 240 that limits the proportion of the regenerative braking torque in the required braking torque when the regenerative braking torque exceeds the modification threshold.

The required torque calculation unit 210, upon reception of the displacement amount information relating to the input rod 6 from the CAN communication line 201, calculates a torque value of the required braking torque in accordance with the displacement amount information. For example, the required braking torque is increased as the displacement amount information increases. The required torque calculation unit 210 then supplies requirement information indicating the torque value to the threshold calculation unit 230.

The regenerative torque determination unit 220, upon reception of the requirement information from the required torque calculation unit 210, determines an upper limit value of the regenerative braking torque that can be allocated to the motor/generator 121 from the required braking torque indicated in the requirement information. The regenerative torque determination unit 220 then supplies regenerative torque information indicating the upper limit value of the regenerative braking torque to the regenerative torque limitation unit 240.

The threshold calculation unit 230 receives condition information indicating the operating conditions of the motor/generator 121 and the charging device 122 from the CAN communication line 201. The condition information includes battery information, motor information, and inverter information. The battery information indicates the SOC and a temperature of the battery 104. The motor information indicates the rotation speed and a temperature of the motor/generator 121. The inverter information indicates a temperature of the inverter 103.

The threshold calculation unit 230 uses the condition information relating to the motor/generator 121 and the charging device 122 to calculate the limit value of the regenerative braking torque that can currently be generated by the motor/generator 121. For example, the threshold calculation unit 230 calculates a limit value determined from condition information relating to the drive unit 101, which indicates a vehicle speed and so on, using the output characteristic of the motor/generator 121 and characteristics of the battery 104. It should be noted that the threshold calculation unit 230 may calculate the limit value of the regenerative braking torque on the basis of condition information relating to either the motor/generator 121 or the charging device 122.

Further, the threshold calculation unit 230 obtains an allowable variation amount allowed by the driver in relation to rapid variation in the increase rate of the regenerative braking torque, and calculates a variation suppression prescribed value from the allowable variation amount.

For example, the threshold calculation unit 230 holds a prescribed value prescribing a modification range of the regenerative braking torque required to reduce the increase rate of the regenerative braking torque. The prescribed value is set in advance in accordance with an allowable amount of variation in the brake pedal reaction force allowed by the hybrid vehicle 100. The threshold calculation unit 230 subtracts the prescribed value from the limit value of the regenerative braking torque, and calculates a resulting subtracted value as the variation suppression prescribed value. The threshold calculation unit 230 then supplies the variation suppression prescribed value to the regenerative torque limitation unit 240 as the modification threshold.

The regenerative torque limitation unit 240 receives the regenerative torque information from the regenerative torque determination unit 220, and receives the modification threshold from the threshold calculation unit 230. When the regenerative braking torque indicated by the regenerative torque information is smaller than the modification threshold, the regenerative torque limitation unit 240 maintains the proportion of the regenerative braking torque in the required braking torque at a constant level.

When the regenerative braking torque exceeds the modification threshold, on the other hand, the regenerative torque limitation unit 240 reduces the increase rate per unit time of the regenerative braking torque by increasing the proportion of the frictional braking torque in the required braking torque. In other words, the regenerative torque limitation unit 240 increases the amount of frictional braking torque by reducing the proportion of the regenerative braking torque through brake pedal reaction force variation suppression processing. Next, a method of suppressing variation in the brake pedal reaction force will be described with reference to the figures.

Figure 5:
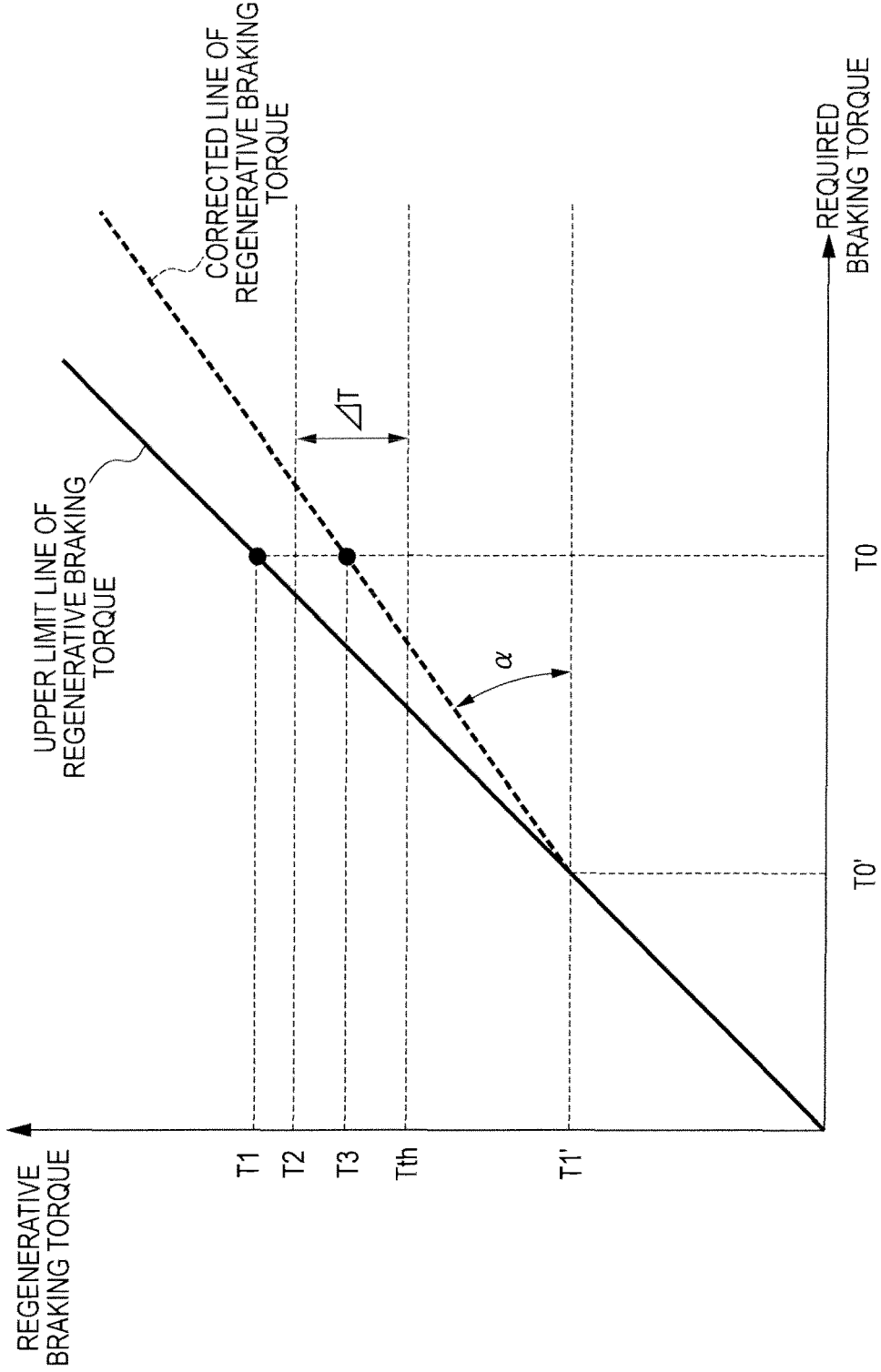
FIG. 5 is a view showing a method of suppressing variation in the brake pedal reaction force.

FIG. 5 is a view showing an example of a method employed by the control unit 200 to suppress variation in the brake pedal reaction force.

In FIG. 5, the required torque calculation unit 210 calculates a required braking torque T0 on the basis of the displacement amount information relating to the input rod 6 from the brake operation amount detection device 7. Next, the regenerative torque determination unit 220 determines an upper limit value T1 of the regenerative braking torque relative to the required braking torque T0. For example, the regenerative torque determination unit 220 holds a map on which values of the required braking torque and upper limit values of the regenerative braking torque are associated with each other for each required braking torque value, and extracts the upper limit value T1 associated with the value T0 of the required braking torque from the map.

Next, the threshold calculation unit 230 calculates a limit value T2 of the regenerative braking torque that can be generated by the motor/generator 121 on the basis of the condition information of the hybrid vehicle 100. For example, the threshold calculation unit 230 calculates the limit value T2 from speed information indicating the vehicle speed and so on, and operating conditions such as the output characteristic of the motor/generator 121 and the reception characteristic of the battery 104.

Further, the threshold calculation unit 230 obtains a prescribed value $\Delta T$ of the regenerative braking torque determined in accordance with the allowable variation amount allowed by the driver. The threshold calculation unit 230 then subtracts the prescribed value $\Delta T$ from the limit value T2 of the regenerative braking torque, as shown in a following equation, sets the subtracted value as a modification threshold Tth for dealing with reaction force variation, and supplies the modification threshold Tth to the regenerative torque limitation unit 240.

$$Tth = T2 - \Delta T \qquad \text{[Numeral 1]}$$

Next, the regenerative torque limitation unit 240 determines whether or not the upper limit value T1 of the regenerative braking torque is equal to or larger than the modification threshold Tth. Having determined that the upper limit value T1 is equal to or larger than the modification threshold Tth, the regenerative torque limitation unit 240 obtains a required braking torque T0' and a regenerative braking torque T1'.

The regenerative torque limitation unit 240 then sets the increase rate of the regenerative braking torque from the required braking torque T0' to T0 at a variation gradient α smaller than "1". More specifically, the regenerative torque limitation unit 240 determines the increase gradient α from the allowable variation amount allowed by the driver relative to variation in the brake pedal reaction force at the regenerative braking torque limit value.

The regenerative torque limitation unit 240 then uses the required braking torque T0', the regenerative braking torque T1', and the increase gradient α to calculate a corrected value T3 of the regenerative braking torque T1 corresponding to the required braking torque T0. Since the corrected value T3 of the regenerative braking torque is smaller than the limit value T2, the regenerative torque limitation unit 240 sets the corrected value T3 as a regeneration command value T, and transmits the regeneration command value T to the brake device 1 and the inverter 103.

As a result, the control unit 200 can reduce the increase rate of the regenerative braking torque after the brake operation amount detection device 7 detects displacement of the input rod 6 and before the regenerative braking torque reaches the limit value T2.

Figure 6:
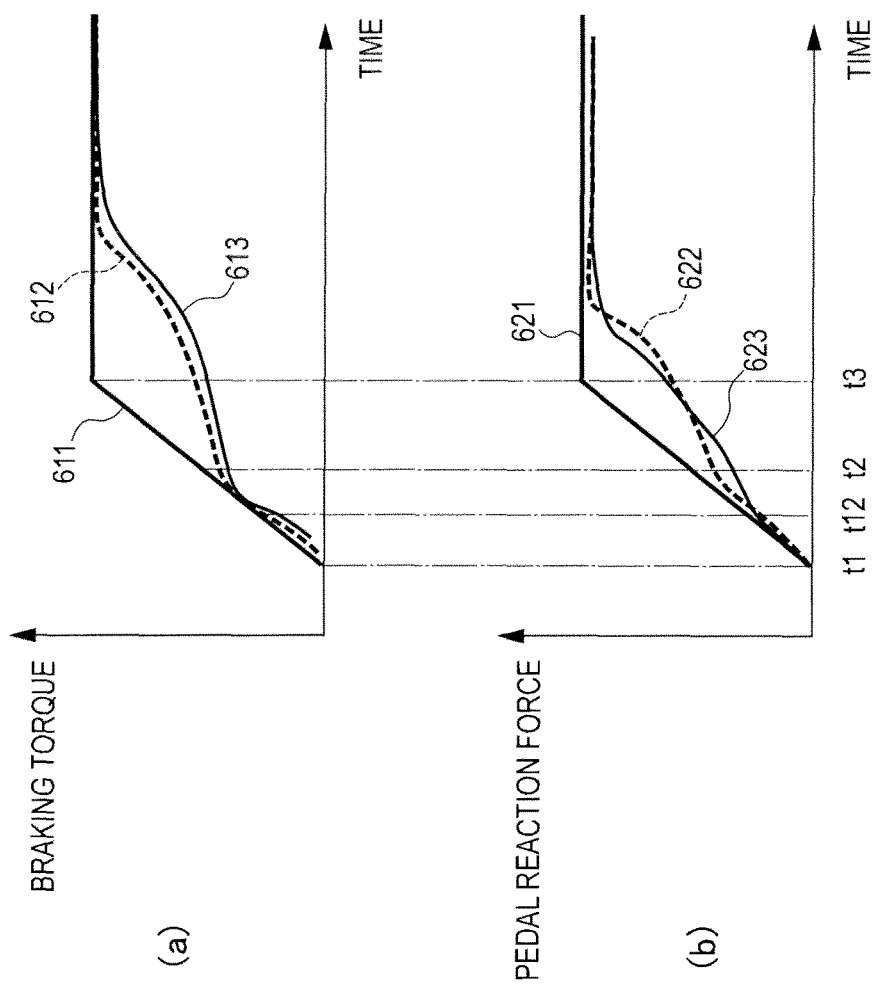
FIG. 6 is a view showing variation in the brake pedal reaction force following variation suppression processing.

FIG. 6 is a view showing an example in which variation in the brake pedal reaction force is suppressed by the reaction force variation suppression processing. FIG. 6A is a view showing a regenerative braking torque 613 resulting from the reaction force variation suppression processing. FIG. 6B is a view showing variation 623 in the brake pedal reaction force corresponding to the regenerative braking torque 613.

As shown in FIG. 6A, at a time t2, a regenerative braking torque 612 not subjected to the reaction force variation suppression processing reaches the limit value such that the increase rate thereof decreases rapidly. The increase rate of the regenerative braking torque 613, on the other hand, is reduced from a time t12 to the time t2, and therefore variation in the regenerative braking torque in the vicinity of the time t2 is suppressed.

As shown in FIG. 6B, therefore, rapid variation in the brake pedal reaction force 623 is suppressed in comparison with a brake pedal reaction force 622 generated when the reaction force variation suppression processing is not performed. Hence, discomfort experienced by the driver can be reduced by the reaction force variation suppression processing.

Figure 7:
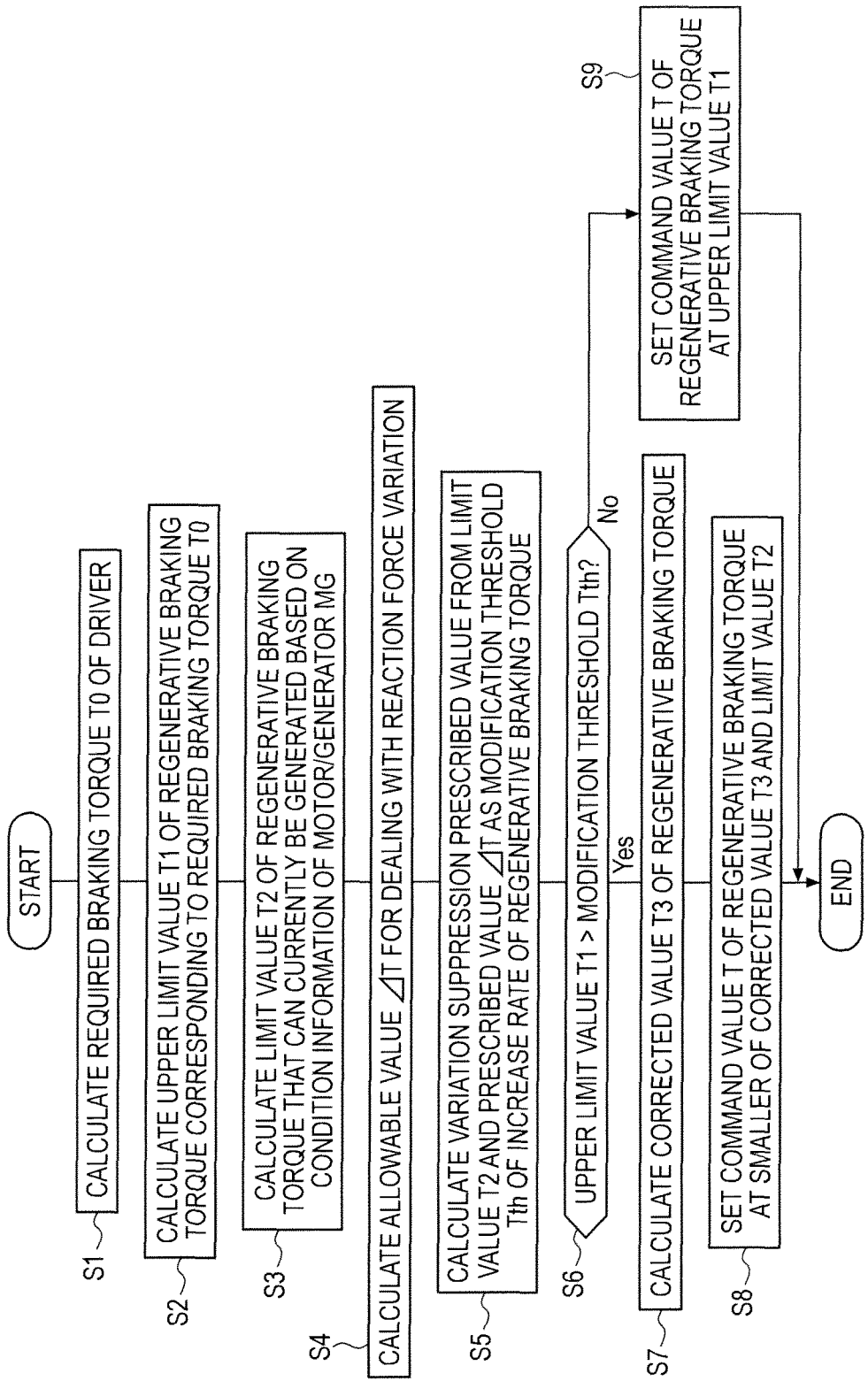
FIG. 7 is a flowchart showing processing procedures of the variation suppression processing.

FIG. 7 is a flowchart showing processing procedures of the reaction force variation suppression processing performed by the control unit 200.

First, the required torque calculation unit 210 calculates the required braking torque T0 of the driver on the basis of the stroke of the input rod 6, detected by the brake operation amount detection device 7 (step S1). The required torque calculation unit 210 supplies the value T0 of the required braking torque to the regenerative torque determination unit 220.

Next, the regenerative torque determination unit 220, upon reception of the required braking torque T0 from the required torque calculation unit 210, determines the upper limit value T1 of the regenerative braking torque corresponding to the required braking torque T0 (step S2). The regenerative torque determination unit 220 supplies the regenerative braking torque T1 to the regenerative torque limitation unit 240.

Further, the threshold calculation unit 230 calculates the limit value T2 of the regenerative braking torque that can be generated by the motor/generator 121 on the basis of the condition information of the hybrid vehicle 100 (step S3). Furthermore, the threshold calculation unit 230 sets the prescribed value ΔT for dealing with reaction force variation, which is determined in accordance with the allowable variation amount allowed by the hybrid vehicle 100 (step S4).

The threshold calculation unit 230 then calculates the variation suppression prescribed value by subtracting the prescribed value ΔT from the limit value T2 of the regenerative braking torque (step S5). The threshold calculation unit 230 supplies the variation suppression prescribed value to the regenerative torque limitation value 240 as the modification threshold Tth.

The regenerative torque limitation unit 240, upon reception of the upper limit value T1 of the regenerative braking torque from the regenerative torque determination unit 220 and the modification threshold Tth from the threshold calculation unit 230, determines whether or not the regenerative braking torque T1 exceeds the modification threshold Tth (step S6). When the regenerative braking torque T1 is equal to or smaller than the modification threshold Tth, the regenerative torque limitation unit 240 sets the upper limit value T1 as the regeneration command value T of the regenerative braking torque (step S9).

When, on the other hand, the regenerative braking torque T1 exceeds the modification threshold Tth, the regenerative torque limitation unit 240 calculates the corrected value T3, which is smaller than the regenerative braking torque T1, using the variation suppression method described using FIG. 5 (step S7). The regenerative torque limitation unit 240 then sets the smaller value of the limit value T2 and the corrected value T3 of the regenerative braking torque as the regeneration command value T (step S8), whereupon the reaction force variation suppression processing performed by the control unit 200 is terminated.

According to this embodiment, the control unit 200 uses the limit value of the regenerative braking torque, which is determined in accordance with the operating conditions of the motor/generator 121 and the charging device 122, to reduce a ratio of the regenerative braking torque to the frictional braking torque before the regenerative braking torque reaches the limit value.

Hence, even if the increase rate of the regenerative braking torque decreases in the vicinity of the limit value of the regenerative braking torque, the ratio of the regenerative braking torque to the frictional braking torque is reduced in advance, and therefore rapid variation in the regenerative braking torque is suppressed. Accordingly, variation in the brake pedal reaction force caused by variation in the regenerative braking torque in the vicinity of the limit value is also suppressed. As a result, the control unit 200 can reduce the discomfort experienced by the driver.

Furthermore, in the control unit 200 according to this embodiment, the threshold calculation unit 230 sets the modification threshold in accordance with the limit value of the regenerative braking torque, and when the regenerative braking torque exceeds the modification threshold, the regenerative torque limitation unit 240 limits the regenerative braking torque by increasing the proportion of the frictional braking torque.

Hence, the control unit 200 varies the modification threshold in accordance with the limit value of the regenerative braking torque, which varies in accordance with the operating conditions of the motor/generator 121 and the charging device 122, and therefore, in contrast to a configuration in which the modification threshold is fixed, the limit value of the regenerative braking torque can be prevented from falling below the modification threshold. As a result, the control unit 200 can reduce the proportion of the regenerative braking torque in the required braking torque more reliably before the regenerative braking torque reaches the limit value.

Second Embodiment

A control unit according to a second embodiment has an identical basic configuration to the control unit 200 shown in FIG. 4. Only differences with the control unit 200 according to the first embodiment will be described below.

The threshold calculation unit 230 obtains a required value (referred to hereafter as a "regeneration required value") of an amount of energy to be regenerated by the motor/generator 121. The regeneration required value is stored in the threshold calculation unit 230 in advance, for example. When the regeneration required value is larger than the variation suppression prescribed value, the threshold calculation unit 230 sets the regeneration required value as the modification threshold, and supplies the set modification threshold to the regenerative torque limitation unit 240.

When the upper limit value of the regenerative braking torque is smaller than the regeneration required value, even if the regenerative braking torque is smaller than the variation suppression prescribed value, the regenerative torque limitation unit 240 does not reduce the increase rate of the regenerative braking torque. In other words, even when the upper limit value of the regenerative braking torque is smaller than the regeneration required value, the regenerative torque limitation unit 240 does not modify the proportion of the regenerative braking torque in the required braking torque.

Figure 8:
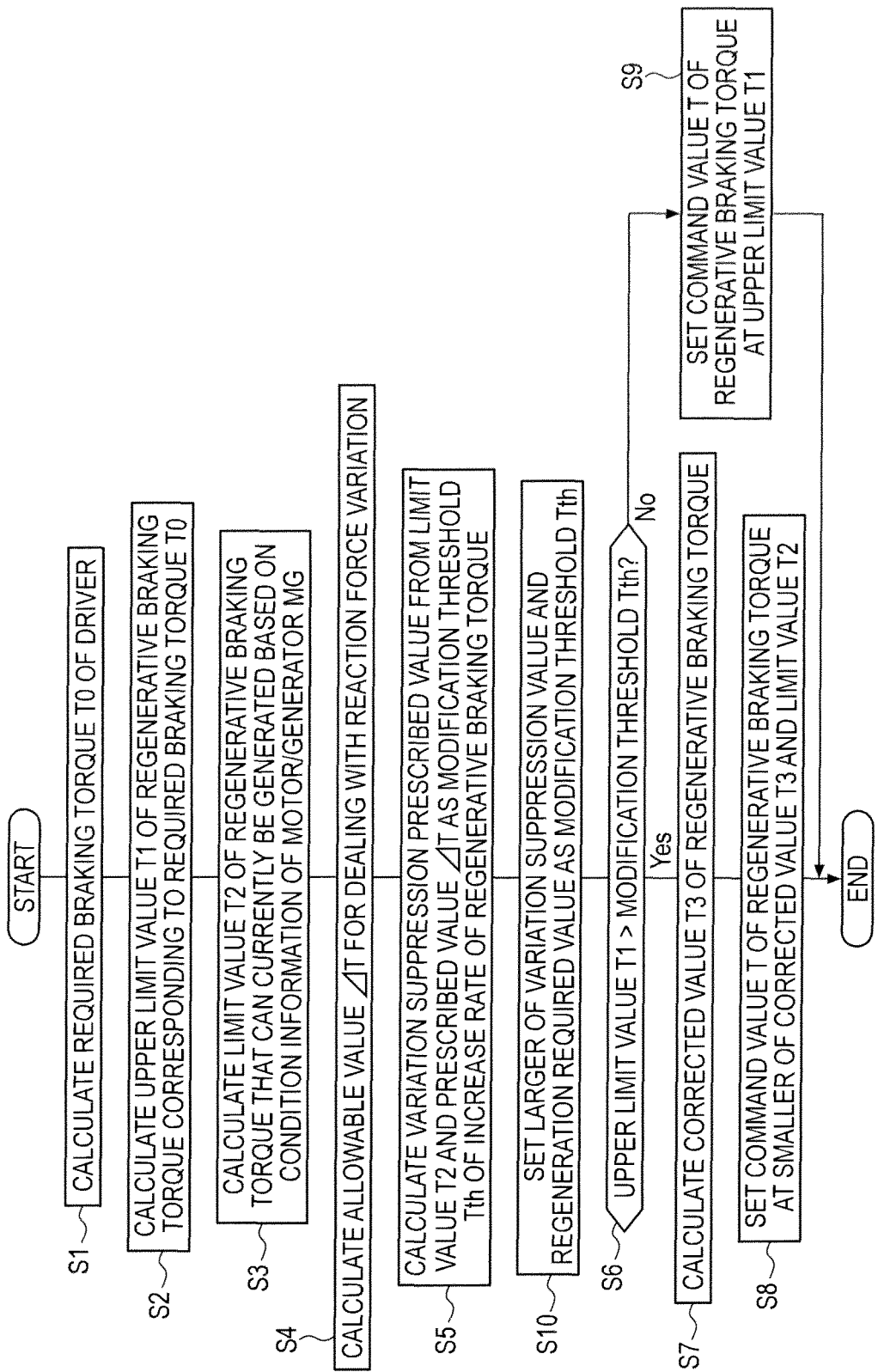
FIG. 8 is a flowchart showing variation suppression processing according to a second embodiment.

FIG. 8 is a flowchart showing processing procedures of reaction force variation suppression processing according to the second embodiment. Processing other than that of a step S10 in FIG. 8 is similar to the processing of FIG. 7, and therefore the step S10 will mainly be described here. It should be noted that in the step S5, the threshold calculation unit 230 calculates the variation suppression prescribed value by subtracting the prescribed value ΔT from the limit value T2 of the regenerative braking torque.

Next, the threshold calculation unit 230 obtains the regeneration required value required to recover the braking energy that can be regenerated by the motor/generator 121, and compares the regeneration required value with the variation suppression prescribed value (step S10). The threshold calculation unit 230 then sets the larger of the regeneration required value and the variation suppression prescribed value as the modification threshold, and outputs the set modification threshold to the regenerative torque limitation unit 240.

In other words, the threshold calculation unit 230 sets the regeneration required value in the regenerative torque limitation unit 240 as the modification threshold only when the variation suppression prescribed value, which varies according to the vehicle speed and so on, is smaller than the regeneration required value, whereupon the routine advances to the step S6.

According to this embodiment, the threshold calculation unit 230 sets the modification threshold at or above the regeneration required value. Therefore, the control unit 200 can prioritize recovery of the minimum required regenerative energy while suppressing rapid variation in the brake pedal reaction force. When the vehicle speed is high, for example, the amount of regenerative energy increases, and therefore a large amount of regenerative energy can be recovered without limiting the regenerative braking torque even when the limit value of the regenerative braking torque is low such that the variation suppression prescribed value is smaller than the regeneration required value. It should be noted that the threshold calculation unit 230 may set the regeneration required value to be steadily larger as the vehicle speed increases. In so doing, a recovery efficiency of the regenerative energy can be improved even further.

Third Embodiment

A control unit according to a third embodiment has an identical basic configuration to the control unit 200 shown in FIG. 4. In this embodiment, a limitation cancellation method for canceling the limitation on the regenerative braking torque will be described.

The required torque calculation unit 210 receives the displacement amount information relating to the input rod 6 periodically from the brake operation amount detection device 7, and calculates the torque value of the required braking torque every time the displacement amount information is received.

The regenerative torque limitation unit 240 includes a predetermined holding determination value for determining a condition in which an operation of the brake pedal BP is held. When variation in the torque value from the required torque calculation unit 210 falls to or below the holding determination value, the regenerative torque limitation unit 240 cancels the limitation on the regenerative braking torque by reducing the proportion of the frictional braking torque in the required braking torque at predetermined cancellation period intervals.

For example, upon reception of the torque value T0 of the required braking torque from the required torque calculation unit 210, the regenerative torque limitation unit 240 calculates a torque difference between a previous torque value received immediately before the torque value T0 and the torque value T0. When the torque difference is equal to or smaller than the holding determination value, the regenerative torque limitation unit 240 determines that the operation of the brake pedal BP is being held, and therefore cancels the limitation on the regenerative braking torque.

To return the regenerative braking torque to the upper limit value in steps, the regenerative torque limitation unit 240 adds a predetermined cancellation width ΔT1 to the corrected value T3 of the regenerative braking torque, for example. As shown in a following equation, the regenerative torque limitation unit 240 then sets the smaller value of an added value (T3+ΔT1) obtained by adding the cancellation width to the corrected value and the limit value T2 of the regenerative braking torque as a cancellation value T4 of the regenerative braking torque, and sets the cancellation value T4 as the regeneration command value.

$$T4=\min(T3+\Delta T1,T2) \quad \text{[Numeral 2]}$$

In a situation where variation in the required braking torque remains at or below the holding determination value, the regenerative torque limitation unit 240 performs predetermined time gradient processing in which the regeneration command value is increased repeatedly until the regenerative braking torque reaches the limit value T2 by increasing the regeneration command value by ΔT1 in each cancellation period.

Figure 9:
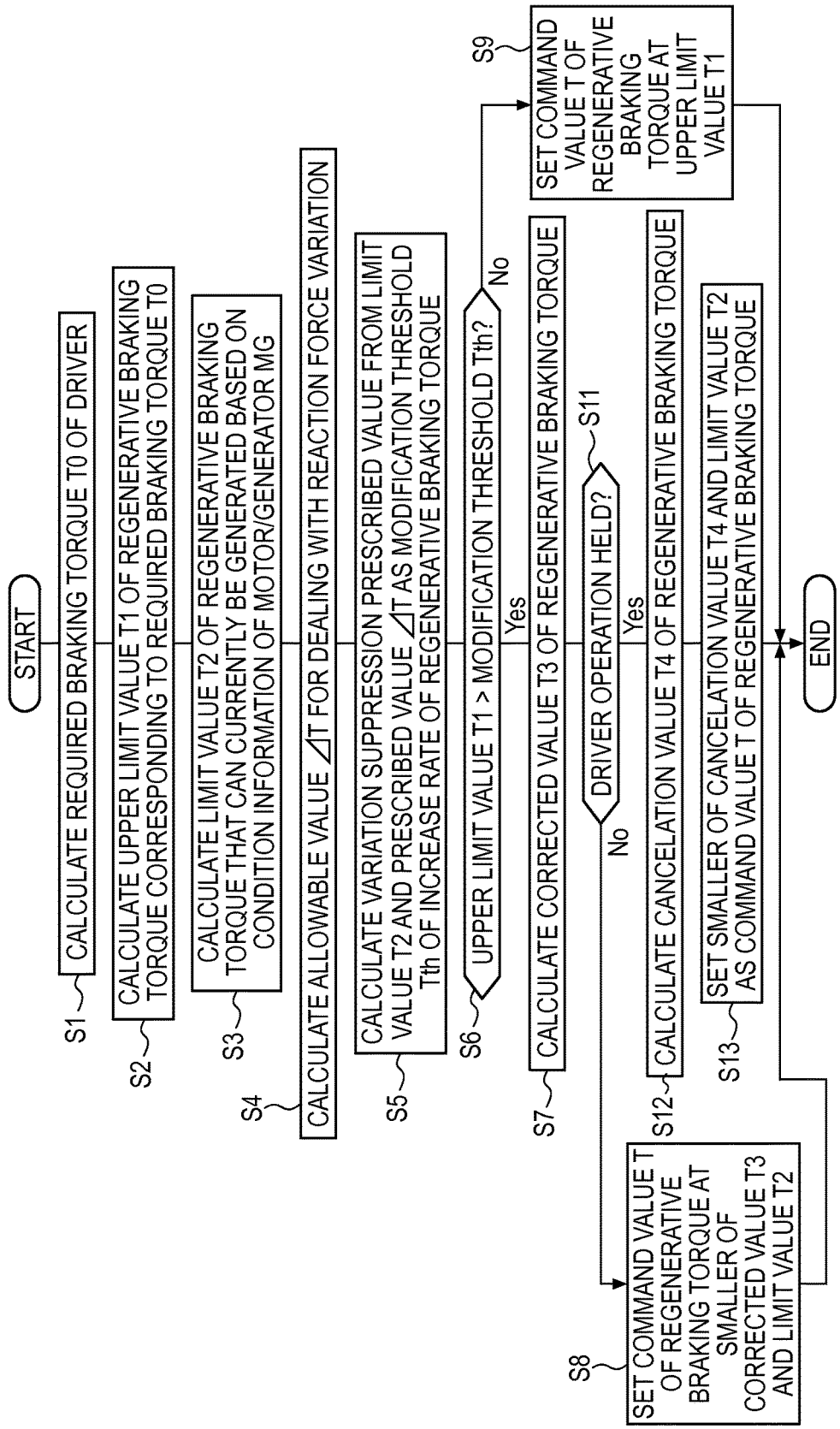
FIG. 9 is a flowchart showing variation suppression processing according to a third embodiment.

FIG. 9 is a flowchart showing processing procedures of reaction force variation suppression processing according to the second embodiment. Processing other than that of steps S11 to S13 in FIG. 9 is similar to the processing of FIG. 7, and therefore the steps S11 to S13 will mainly be described here. It should be noted that in the step S7, the regenerative torque limitation unit 240 calculates the corrected value T3 of the regenerative braking torque.

Next, upon reception of the torque value of the required braking torque from the required torque calculation unit 210, the regenerative torque limitation unit 240 determines whether or not the operation of the brake pedal BP is being maintained (step S11). More specifically, after receiving the required braking torque T0 from the required torque calculation unit 210, the regenerative torque limitation unit 240 determines the difference between the current torque value T0 and the previous torque value.

When the difference in the required braking torque equals or exceeds the holding determination value, the regenerative torque limitation unit 240 sets the smaller of the limit value T2 and the corrected value T3 of the regenerative braking torque as the regeneration command value T (step S8).

When the difference in the required braking torque is smaller than the holding determination value, on the other hand, the regenerative torque limitation unit 240 determines the added value (T3+ΔT1) by adding the cancellation width ΔT1 to the corrected value T3 calculated in the step S7. The regenerative torque limitation unit 240 then calculates the smaller of the added value (T3+ΔT1) and the limit value T2 of the regenerative braking torque as the cancellation value T4 (step S12).

The regenerative torque limitation unit 240 sets the cancellation value T4 of the regenerative braking torque as the regeneration command value T (step S13), whereupon the reaction force variation suppression processing is terminated.

According to this embodiment, when the variation in the required braking torque is equal to or smaller than the holding determination value, the regenerative torque limitation unit 240 cancels the limitation on the regenerative braking torque by reducing the proportion of the frictional braking torque in the required braking torque in cancellation period intervals. Hence, when the operation of the brake pedal BP is in a held condition, the regenerative torque limitation unit 240 reduces the proportion of the frictional braking torque in steps, and therefore braking energy can be recovered efficiently using the regenerative braking torque while suppressing variation in the brake pedal reaction force.

Therefore, when the possibility of rapid variation in the brake pedal reaction force is low, the control unit 200 increases the regenerative braking torque to the limit value of the regenerative braking torque in steps, and as a result, the regenerative energy recovery efficiency can be improved without causing the driver to experience discomfort.

Fourth Embodiment

Figure 10:
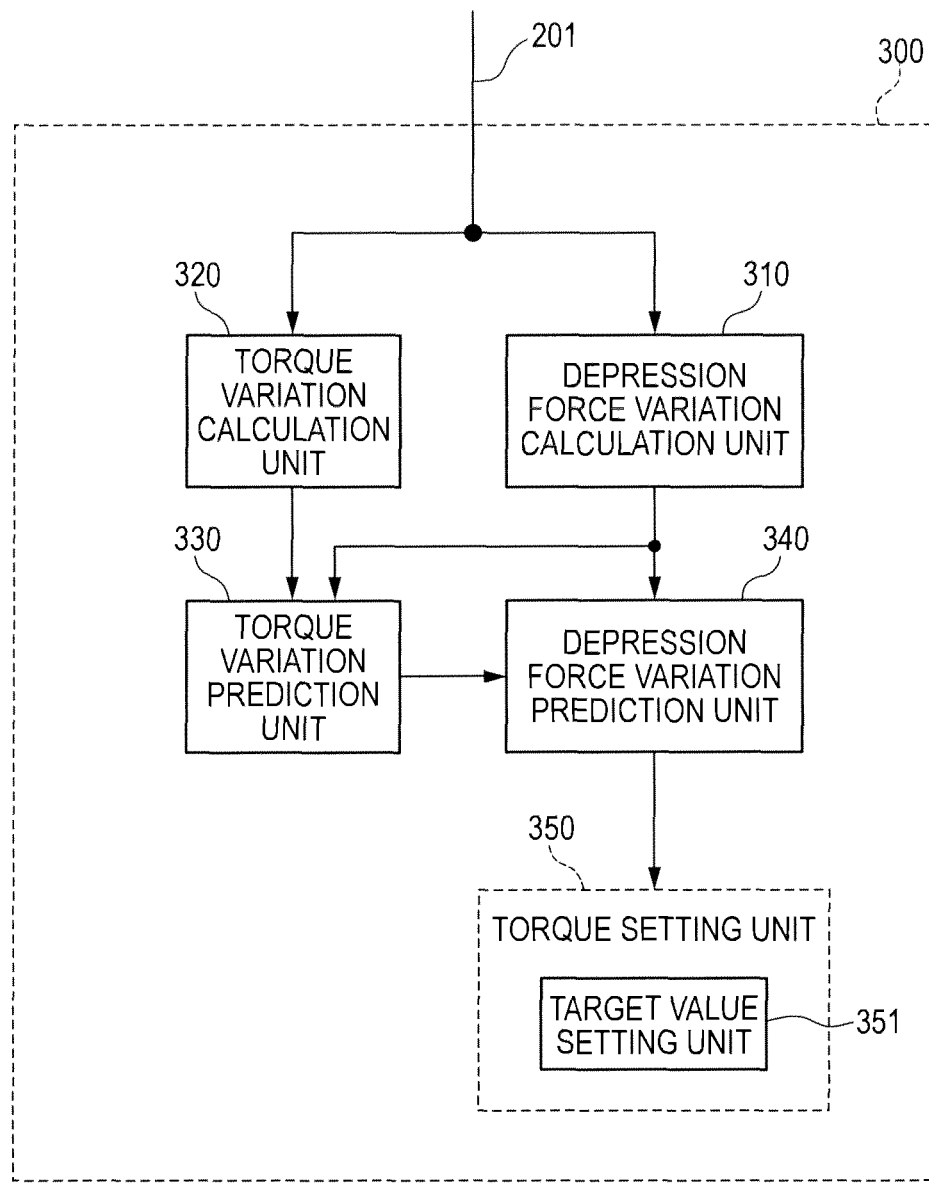
FIG. 10 is a functional block diagram showing a configuration of a control unit according to a fourth embodiment.

FIG. 10 is a functional block diagram showing a configuration of a control unit according to a fourth embodiment. A control unit 300 sets the regeneration command value of the regenerative braking torque on the basis of the displacement amount information relating to the input rod 6 from the brake operation amount detection device 7. The control unit 300 corresponds to the control unit 200 shown in FIG. 1.

The control unit 300 includes a depression force variation calculation unit 310, a torque variation calculation unit 320, a torque variation prediction unit 330, a depression force variation prediction unit 340, and a torque setting unit 350. The torque setting unit 350 includes a target value setting unit 351 that limits the increase rate of the regenerative braking torque.

The depression force variation calculation unit 310 calculates a variation speed of the depression force of the brake pedal BP.

The depression force variation calculation unit 310 receives the displacement amount information relating to the input rod 6 periodically from the brake operation amount detection device 7 via the CAN communication line 201. Further, the depression force variation calculation unit 310 obtains the master cylinder pressure Pmc of the master cylinder 2, which varies in accordance with the displacement amount information relating to the input rod 6. For example, the depression force variation calculation unit 310 may calculate the master cylinder pressure Pmc from the displacement amount information relating to the input rod 6, or may calculate the master cylinder pressure Pmc using the fluid pressure values detected by the fluid pressure sensors 13 and 14 shown in FIG. 2.

The depression force variation calculation unit 310 calculates a depression force F using the master cylinder pressure Pmc, a surface area AIR of the input rod 6, a spring constant K of the springs 6d and 6e, and a relative position Δx of the primary piston 2b relative to the input rod 6. More specifically, the depression force variation calculation unit 310 calculates the depression force F using a following equation.

[Numeral 3]

$$F = Pmc \times AIR + K \times \Delta x \quad \quad \text{Equation 3}$$

The depression force variation calculation unit 310 calculates a variation speed of the depression force up to the present on the basis of variation in the displacement amount information relating to the input rod 6 from the brake operation amount detection device 7. For example, upon reception of the displacement amount information from the brake operation amount detection device 7, the depression force variation calculation unit 310 determines a displacement difference between a current value of the displacement amount information and a previous value of the displacement amount information immediately prior to reception of the current displacement amount information. The depression force variation calculation unit 310 then calculates the depression force variation speed by dividing the displacement difference by a time extending from reception of the immediately preceding displacement amount information to reception of the current displacement amount information. The depression force variation calculation unit 310 then supplies depression force variation information indicating a value of the depression force variation speed to the depression force variation prediction unit 340.

The torque variation calculation unit 320 calculates a variation speed of the regenerative braking torque applied by the motor/generator 121.

The torque variation calculation unit 320 calculates a variation speed of the regenerative braking torque up to the present by subtracting a previous value of the regenerative braking torque set previously by the torque setting unit 350, for example, from a current value of the regenerative braking torque. The torque variation calculation unit 320 supplies torque variation information indicating a value of the variation speed of the regenerative braking torque to the torque variation prediction unit 330.

Further, the torque variation calculation unit 320 receives the condition information from the motor/generator 121 and the charging device 122, calculates the limit value of the regenerative braking torque using the condition information from the motor/generator 121 and the charging device 122, and supplies the limit value to the torque variation prediction unit 330.

The torque variation prediction unit 330 is a torque estimation unit that estimates a variation speed of the regenerative braking torque following the elapse of a predetermined time from the present on the basis of the torque variation information from the torque variation calculation unit 320.

For example, the torque variation prediction unit 330 estimates a driver operation following the elapse of the predetermined time, and calculates a vehicle speed following the elapse of the predetermined time from the present, from the torque variation information, the displacement amount information relating to the input rod 6, and so on accompanying a current driver operation.

The torque variation prediction unit 330 calculates a predicted value of the regenerative braking torque required to reduce the vehicle speed following the elapse of the predetermined time from the present. When the predicted value is larger than the limit value of the regenerative braking torque received from the torque variation calculation unit 320, the torque variation prediction unit 330 reduces the predicted value below the limit value of the regenerative braking torque, for example. The reduction in the regenerative braking torque is compensated for by the frictional braking torque.

The torque variation prediction unit 330 then calculates a predicted value of the variation speed following the elapse of the predetermined time by subtracting the regenerative braking torque following the elapse of the predetermined time from the current regenerative braking torque. The torque variation prediction unit 330 then supplies torque prediction information indicating the predicted value of the regenerative braking torque to the depression force variation prediction unit 340.

The depression force variation prediction unit 340 predicts a variation speed of the depression force following the elapse of a predetermined time from the present on the basis of the torque variation prediction information from the torque variation prediction unit 330.

The depression force variation prediction unit 340 uses Equation 1 to convert the variation speed indicated by the torque variation prediction information into a predicted value of the depression force variation speed following the elapse of the predetermined time. The depression force variation prediction unit 340 then supplies depression force variation prediction information indicating the predicted value of the depression force variation speed to the torque setting unit 350.

The torque setting unit 350 reduces the increase gradient of the regenerative braking torque in accordance with the depression force variation prediction information from the depression force variation prediction unit 340. The torque setting unit 350 holds a predetermined prescribed value for limiting the increase gradient of the regenerative braking torque in the target value setting unit 351.

The torque setting unit 350 calculates a depression force difference between the variation speed indicated in the depression force variation information from the depression force variation calculation unit 310 and the variation speed indicated in the depression force variation prediction information, or in other words the depression force variation speed following the elapse of the predetermined time from the present. The torque setting unit 350 then determines whether or not the depression force difference exceeds a target value. When the depression force difference is equal to or smaller than the target value, the torque setting unit 350 sets the value of the regenerative braking torque calculated in advance as the regeneration command value.

When the depression force difference exceeds the target value, on the other hand, the torque setting unit 350 determines that a brake pedal reaction force large enough to cause the driver to experience discomfort will be generated following the elapse of the predetermined time from the present, and calculates the regenerative braking torque variation speed following the elapse of the predetermined time from the present using Equation 1 so that the depression force difference matches the target value. The torque setting unit 350 then determines the regenerative braking torque so as to match the regenerative braking torque variation speed, and sets the determined regenerative braking torque as the regeneration command value, whereby the regeneration command value is corrected to a smaller value than the regeneration command value calculated in advance. The torque setting unit 350 then sets the corrected regeneration command value as the regenerative cooperation control command, and supplies the regenerative cooperation control command respectively to the brake device 1 and the inverter 103.

The target value setting unit 351 increases and reduces the target value in accordance with a depression speed of the driver. The target value setting unit 351 receives the depression force variation prediction information from the depression force variation prediction unit 340, and sets the target value to be steadily smaller than the prescribed value as the variation speed indicated by the depression force variation prediction information decreases. It should be noted that the target value setting unit 351 may set the target value using the depression force variation information from the depression force variation calculation unit 310.

Figure 11:
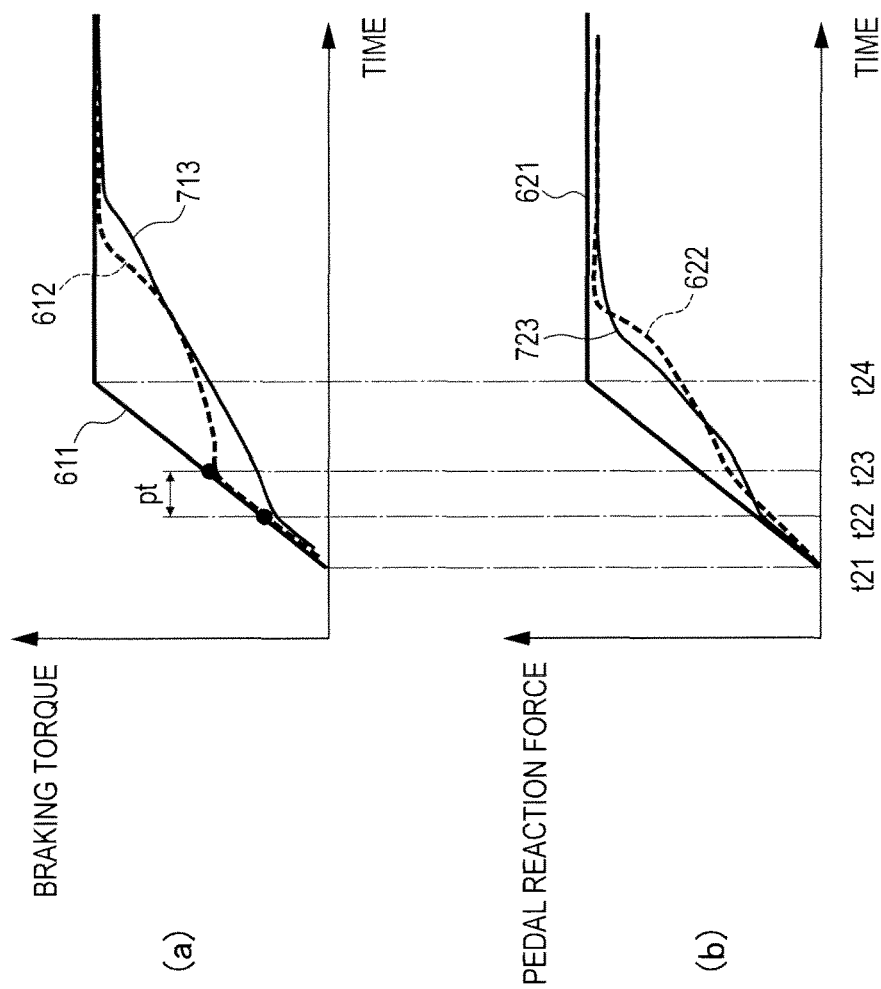
FIG. 11 is a view showing a method of suppressing variation in the brake pedal reaction force.

FIG. 11 is a view showing an example of a method employed by the control unit 300 to suppress variation in the brake pedal reaction force. FIG. 11A is a view showing regenerative braking torque 713 subjected to the reaction force variation suppression processing, and FIG. 11B is a view showing variation 723 in the brake pedal reaction force corresponding to the regenerative braking torque 713. It should be noted that lines 611, 612, 621, and 622 other than the regenerative braking torque 713 and the variation 723 in the brake pedal reaction force are identical to those shown in FIGS. 6A and 6B.

At a time t22 in FIG. 11B, the depression force variation calculation unit 310 calculates the depression force variation speed from a time t21 to the present t22 on the basis of variation in the displacement amount information from the brake operation amount detection unit 7. At this time, as shown in FIG. 11A, the torque variation calculation unit 320 calculates the regenerative braking torque variation speed from the time t21 to the present t22.

The torque variation prediction unit 330 then uses the regenerative braking torque variation speed from the time t21 to the present t22 to calculate a predicted value of the regenerative braking torque variation speed up to a time t23 following the elapse of a predetermined time pt from the present t22. The depression force variation prediction unit 340 converts the regenerative braking torque variation speed into a predicted value of the depression force variation speed following the elapse of the predetermined time pt from the present t22 using Equation 1.

The torque setting unit 350 compares the target value stored in the target value setting unit 351 with the predicted value of the depression force variation speed, and when the predicted value of the variation speed is larger than the target value, sets the target value as the predicted value of the variation speed. Further, the torque setting unit 350 converts the predicted value of the depression force variation speed into the regenerative braking torque variation speed using Equation 1, and sets the regenerative braking torque determined from the regenerative braking torque variation speed as the regeneration command value T.

Hence, as shown in FIG. 11A, the increase gradient of the regenerative braking torque 713 decreases in the vicinity of the time t22, and therefore rapid variation in the brake pedal reaction force 723 in the vicinity of the time t23 in FIG. 11B is suppressed. Accordingly, rapid variation in the brake pedal reaction force 723 is suppressed in comparison with the brake pedal reaction force 622 shown in FIG. 6B, and as a result, the discomfort experienced by the driver is lessened.

Figure 12:
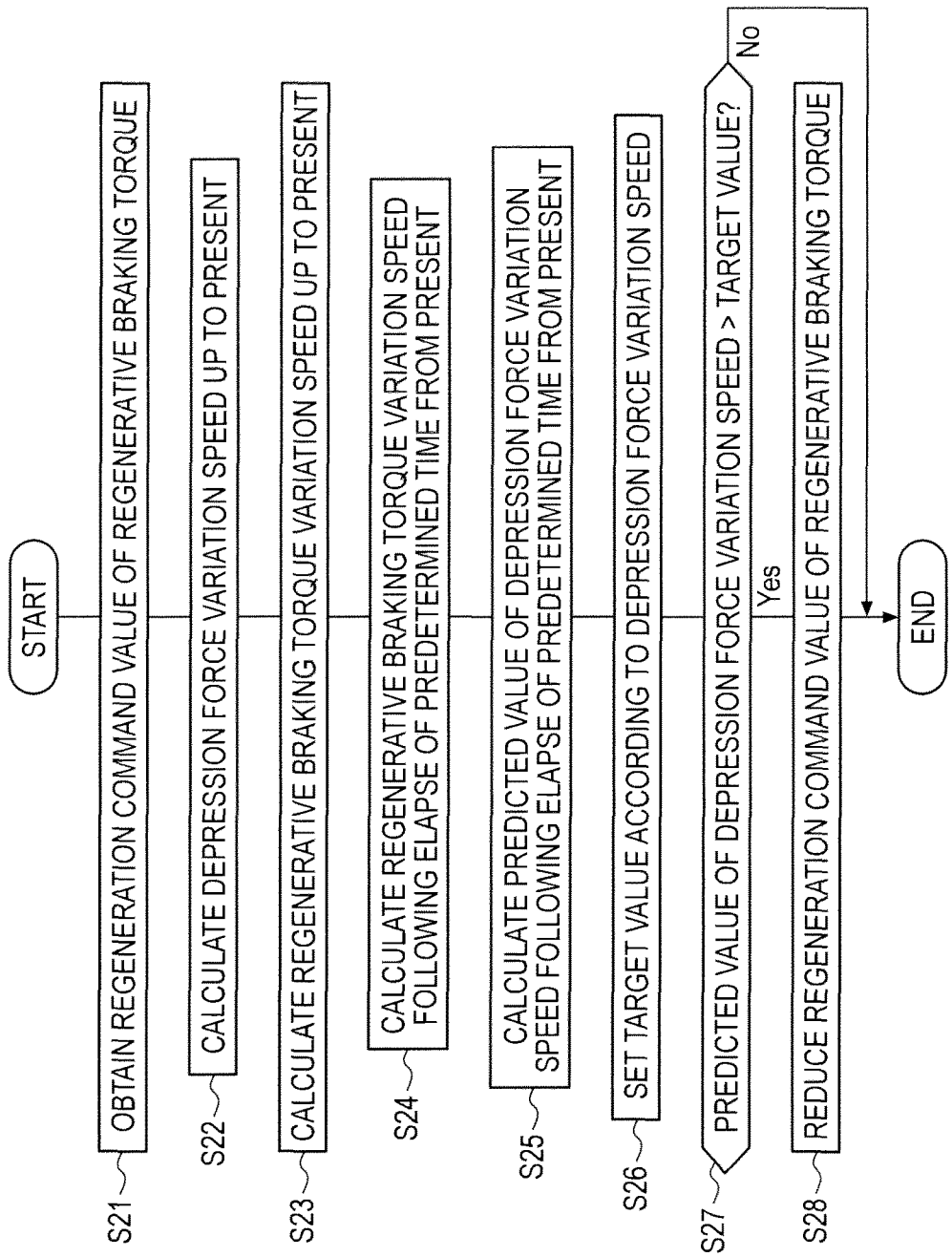
FIG. 12 is a flowchart showing processing procedures of reaction force variation suppression processing.

FIG. 12 is a flowchart showing processing procedures of the reaction force variation suppression processing performed by the control unit 300.

First, the torque setting unit 350 obtains the current regeneration command value calculated in accordance with the displacement amount information relating to the input rod 6, obtained from the brake operation amount detection unit 7 (step S21).

Next, the depression force variation calculation unit 310 calculates a value of the depression force variation speed from displacement of the input rod 6 to the present (step S22). The depression force variation calculation unit 310 supplies depression force variation information indicating the current value to the depression force variation prediction unit 340.

Further, the torque variation calculation unit 320 calculates the regenerative braking torque variation speed up to the present by calculating the difference between the current value and the previous value of the regenerative braking torque (step S23). The torque variation calculation unit 320 supplies torque variation information indicating the value of the variation speed to the torque variation prediction unit 330.

Next, the torque variation prediction unit 330 calculates the predicted value of the regenerative braking torque variation speed following the elapse of the predetermined time using the torque variation information from the torque variation calculation unit 320 and the limit value of the regenerative braking torque (step S24). The torque variation prediction unit 330 supplies torque variation prediction information indicating the predicted value to the depression force variation prediction unit 340.

The depression force variation prediction unit 340 calculates the predicted value of the depression force variation speed following the elapse of the predetermined time from the present from Equation 1 using the torque variation prediction information from the torque variation prediction unit 330 (step S25). The depression force variation prediction unit 340 supplies depression force variation prediction information indicating the predicted value of the variation speed to the torque setting unit 350.

The target value setting unit 351 increases or reduces the target value in accordance with the depression speed of the driver (step S26). For example, the target value setting unit 351 receives the depression force variation information from the depression force variation calculation unit 310, and sets the target value to be steadily smaller as the variation speed indicated by the depression force variation information decreases.

The torque setting unit 350 determines whether or not the depression force variation prediction information from the depression force variation prediction unit 340 exceeds the target value (step S27). When the depression force variation prediction information is equal to or smaller than the target value, the torque setting unit 350 transmits the regenerative cooperation control command including the regeneration command value calculated in the step S21 to the brake device 1 and the inverter 103.

When the variation speed indicated by the depression force variation prediction information exceeds the target value, on the other hand, the torque setting unit 350 modifies the regeneration command value to a smaller value so that the depression force variation speed following the elapse of the predetermined time from the present matches the target value (step S28). The torque setting unit 350 then transmits the regenerative cooperation control command including the regeneration control command to the brake device 1 and the inverter 103.

According to this embodiment, the depression force variation prediction unit 340 calculates the predicted value of the depression force variation speed following the elapse of the predetermined time, and the torque setting unit 360, having determined from the predicted value that rapid variation will occur in the brake pedal reaction force, reduces the increase gradient of the regenerative braking torque in advance.

Hence, by predicting the depression force variation speed, the control unit 300 can suppress rapid variation in the brake pedal reaction force occurring in the vicinity of the limit value of the regenerative braking torque. As a result, the control unit 300 can lessen discomfort experienced by the driver due to rapid variation in the brake pedal reaction force.

Furthermore, in this embodiment, the target value setting unit 351 sets the target value to be smaller as the depression speed of the brake pedal BP decreases.

Typically, rapid variation in the brake pedal reaction force becomes steadily more perceptible as the driver reduces the depression speed. Therefore, by having the target value setting unit 351 set the target value to be smaller as the depression speed decreases, the increase gradient of the regenerative braking torque can be reduced at a time when the driver is highly sensitive to the brake pedal reaction force. As a result, the torque setting unit 350 can reduce discomfort experienced by the driver in the vicinity of the limit value of the regenerative braking torque even further.

Fifth Embodiment

A control unit according to a fifth embodiment has an identical basic configuration to the control unit 300 shown in FIG. 10. Only differences with the control unit 300 according to the fourth embodiment will be described below.

The target value setting unit 351 increases and decreases the target value in accordance with the operation amount of the brake pedal BP. The target value setting unit 351 receives the displacement amount information relating to the input rod 6 from the brake operation amount detection unit 7, and calculates a difference between a current value of the displacement amount information and a previous value of the displacement amount information received immediately before the current information, or in other words the operation amount by the driver. The target value setting unit 351 then sets the target value to be steadily larger as the difference increases.

Figure 13:
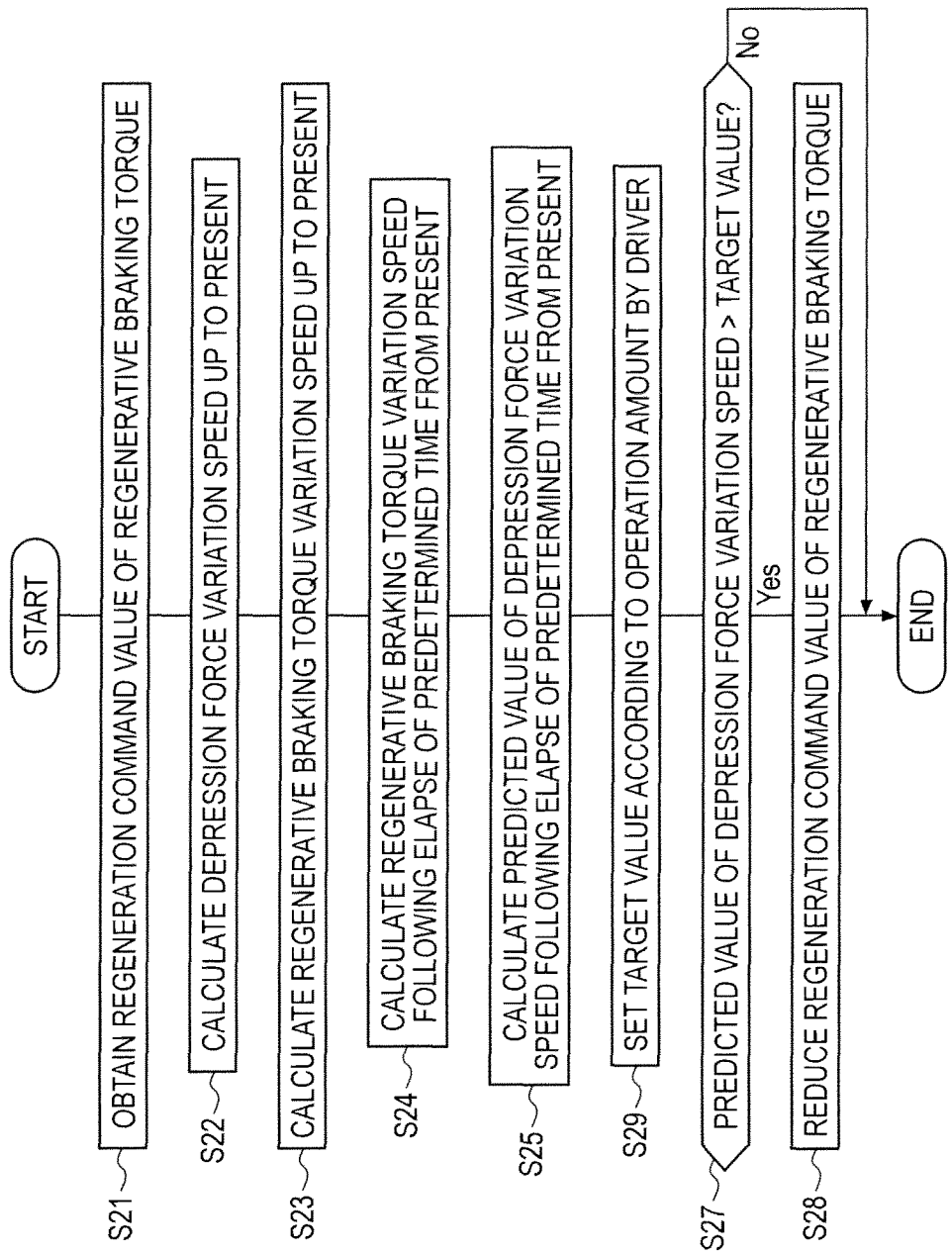
FIG. 13 is a flowchart showing variation suppression processing according to a fifth embodiment.
Figure 14:
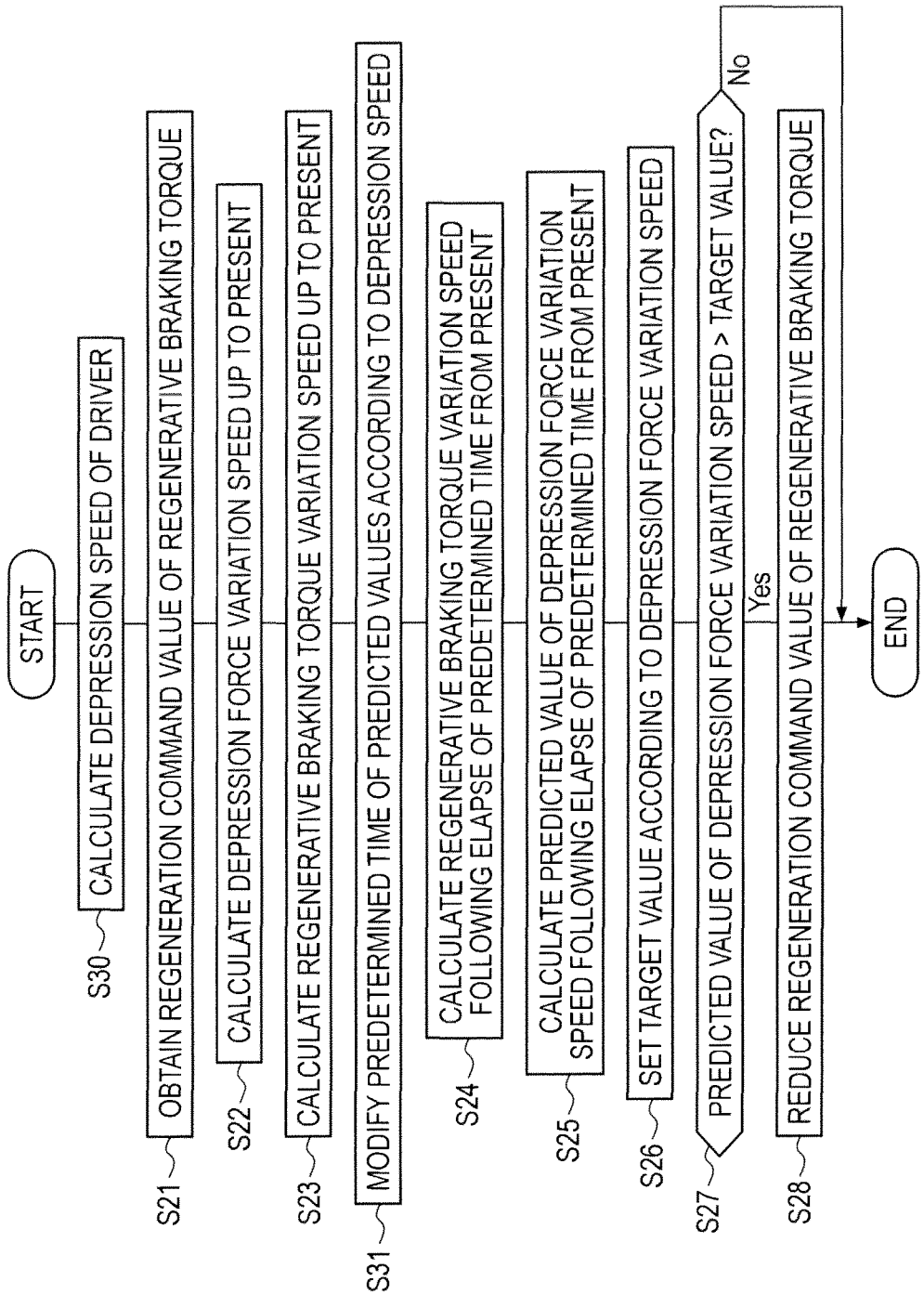
FIG. 14 is a flowchart showing variation suppression processing according to a sixth embodiment.

FIG. 13 is a flowchart showing processing procedures of reaction force variation suppression processing according to the fifth embodiment. Processing other than that of a step S29 in FIG. 13 is similar to the processing of FIG. 11, and therefore the step S29 will mainly be described here.

When the processing of the step S25 is complete, the target value setting unit 351 sets the target value on the basis of the displacement amount information relating to the input rod 6, received from the brake operation amount detection unit 7 (step S29).

According to this embodiment, the target value setting unit 351 sets the target value to be steadily larger as the displacement amount information relating to the input rod 6, received from the brake operation amount detection unit 7, increases.

Typically, the operation amount of the brake pedal BP is large when the driver applies a large depression force to the brake pedal BP, making it more difficult for the driver to perceive rapid variation in the brake pedal reaction force than when the operation amount is small.

Therefore, by having the target value setting unit 351 set the target value to be larger as the displacement amount information relating to the input rod 6 increases, control can be performed such that the increase gradient of the regenerative braking torque is not limited when the sensitivity of the driver to the brake pedal reaction force is sharp. As a result, the torque setting unit 350 can reduce the discomfort experienced by the driver due to rapid variation in the brake pedal reaction force even further while further increasing the regenerative energy recovery efficiency.

Sixth Embodiment

A control unit according to a sixth embodiment has an identical basic configuration to the control unit 300 shown in FIG. 10. Only differences with the control unit 300 according to the fourth embodiment will be described below.

In this embodiment, the depression force variation calculation unit 310 also serves as a time setting unit that modifies the predetermined period pt of the predicted values calculated by the torque variation prediction unit 330 and the depression force variation prediction unit 340 in accordance with the depression speed of the driver.

Having received the displacement amount information relating to the input rod 6 from the brake operation amount detection device 7, the depression force variation calculation unit 310 calculates the depression force variation speed, or in other words the depression speed of the driver, from the difference between the displacement amount information and the previously received displacement amount information.

The depression force variation calculation unit 310 then sets the predetermined period of the predicted values calculated by the torque variation prediction unit 330 and the depression force variation prediction unit 340 to be steadily longer as the depression speed increases. For example, when the depression speed is higher than a predetermined depression threshold, the depression force variation calculation unit 310 supplies prediction time modification information indicating a longer prediction period than the preset predetermined period to the torque variation prediction unit 330 and the depression force variation prediction unit 340.

Having received the prediction time modification information from the depression force variation calculation unit 310, the torque variation prediction unit 330 and the depression force variation prediction unit 340 calculate the respective predicted values of the variation speeds following the elapse of the longer prediction period.

FIG. 13 flowchart showing processing procedures of reaction force variation suppression processing according to the sixth embodiment. Processing other than that of steps S30 and S31 in FIG. 13 is similar to the processing of FIG. 12, and therefore the steps S30 and S31 will mainly be described here.

First, the depression force variation calculation unit 310 calculates the depression speed of the driver from the difference between the displacement amount information relating to the input rod 6, received from the brake operation amount detection device 7, and the previous displacement amount information (step S30). When the depression speed is higher than the depression threshold, the depression force variation calculation unit 310 supplies prediction time modification information indicating a longer prediction period than the preset predetermined time to the torque variation prediction unit 330 and the depression force variation prediction unit 340.

When the processing of the step S23 is complete, the torque variation prediction unit 330 and the depression force variation prediction unit 340, upon reception of the prediction time modification information from the depression force variation calculation unit 310, modify the preset predetermined period to the longer prediction period (step S31). The routine then advances to the step S24.

According to this embodiment, the depression force variation calculation unit 310 sets the predetermined period of the predicted values calculated by the torque variation prediction unit 330 and the depression force variation prediction unit 340 to be steadily longer as the speed at which the driver depresses the brake pedal BP increases.

When the depression speed of the driver is high, a time required for the regenerative braking torque to reach the limit value decreases, and therefore the period in which the variation gradient of the regenerative braking torque is reduced also becomes shorter such that a range in which the variation gradient can be reduced is limited.

Hence, by having the depression force variation calculation unit 310 set the predetermined period of the predicted values to be longer as the depression speed increases, a sufficient period for reducing the variation gradient is secured even when the depression speed is high. Accordingly, the torque setting unit 350 can reduce the variation gradient of the regenerative braking torque sufficiently before the regenerative braking torque reaches the limit value, and as a result, rapid variation in the brake pedal reaction force can be suppressed.

Embodiments of the present invention were described above, but the above embodiments merely illustrate a part of examples of applications of this invention, and the technical scope of this invention is not limited to the specific configurations of the above embodiments.

It should be noted that the above embodiments may be combined appropriately.

This application claims priority based on Tokugan 2012-057744, with a filing date of Mar. 14, 2012 in Japan, the entire contents of which are incorporated into this specification by reference.

The invention claimed is:

1. A braking control device comprising:
a frictional braking device configured to apply a frictional braking torque to a vehicle wheel in response to movement of an input member of a brake pedal;
an electric motor configured to apply a regenerative braking torque to the vehicle wheel;
a charging device configured to be charged with regenerative power generated by the electric motor;
a detection unit configured to detect a displacement amount of the input member; and
a control unit configured to:
   determine a required braking torque of a driver on the basis of the displacement amount detected by the detection unit,
   allocate the required braking torque to the regenerative braking torque and the frictional braking torque,
   increase the regenerative braking torque generated by the electric motor by a predetermined increase rate so as to realize the allocated regenerative braking torque,
   calculate a limit value of the regenerative braking torque that can be generated by the electric motor in accordance with an operating condition of the charging device or the electric motor, and
   set a corrected increase rate of the regenerative braking torque generated by the electric motor that is smaller than the predetermined increase rate so as to reduce a proportion of the regenerative braking torque in the required braking torque after the detection unit detects the displacement amount of the input member and before the regenerative braking torque generated by the electric motor reaches the calculated limit value,
wherein the control unit comprises:
   a torque calculation unit configured to calculate the required braking torque in accordance with the displacement amount of the input member, detected by the detection unit;
   a torque determination unit configured to determine an upper limit value of the regenerative braking torque on the basis of the required braking torque of the driver;
   a threshold calculation unit configured to calculate the limit value of the regenerative braking torque on the basis of condition information indicating the operating condition of the charging device or the electric motor, and calculate a subtracted value obtained by subtracting a prescribed value for reducing the proportion of the regenerative braking torque in advance from the calculated limit value as a modification threshold of the proportion; and
   a regenerative torque limitation unit configured to, when the upper limit value is smaller than the modification threshold, maintain the proportion of the regenerative braking torque in the required braking torque, and configured to, when the upper limit value exceeds the modification threshold, limit the regenerative braking torque by increasing the proportion of the frictional braking torque in the required braking torque.

2. The braking control device as defined in claim 1, wherein, when the upper limit value is smaller than a set value of an amount of energy regenerated by the electric motor, the regenerative torque limitation unit is configured to suppress modification of the proportion of the frictional braking torque.

3. The braking control device as defined in claim 1, wherein, when variation in the required braking torque calculated by the torque calculation unit is equal to or smaller than a predetermined value, the regenerative torque limitation unit is configured to cancel a limitation on the regenerative braking torque by reducing the proportion of the frictional braking torque at predetermined period intervals.

4. A braking control device comprising:
a frictional braking device configured to apply a frictional braking torque to a vehicle wheel in response to movement of an input member of a brake pedal;
an electric motor configured to apply a regenerative braking torque to the vehicle wheel;
a charging device configured to be charged with regenerative power generated by the electric motor;
a detection unit configured to detect a displacement amount of the input member; and
a control unit configured to:
determine a required braking torque of a driver on the basis of the displacement amount detected by the detection unit,
allocate the required braking torque to the regenerative braking torque and the frictional braking torque,
increase the regenerative braking torque generated by the electric motor by a predetermined increase rate so as to realize the allocated regenerative braking torque,
calculate a limit value of the regenerative braking torque that can be generated by the electric motor in accordance with an operating condition of the charging device or the electric motor, and
set a corrected increase rate of the regenerative braking torque generated by the electric motor that is smaller than the predetermined increase rate so as to reduce a proportion of the regenerative braking torque in the required braking torque after the detection unit detects the displacement amount of the input member and before the regenerative braking torque generated by the electric motor reaches the calculated limit value,
wherein the control unit comprises:
a depression force calculation unit configured to calculate a variation speed of a depression force applied to the brake pedal on the basis of variation in the displacement amount of the input member, detected by the detection unit;
a torque calculation unit configured to calculate a variation speed of the regenerative braking torque applied by the electric motor;
a torque estimation unit configured to estimate the variation speed of the regenerative braking torque following the elapse of a predetermined period from the regenerative braking torque calculated by the torque calculation unit;
a depression force prediction unit configured to predict the variation speed of the depression force following the elapse of the predetermined period in accordance with the regenerative braking torque estimated by the torque estimation unit; and
a torque setting unit configured to, when a difference between the variation speed calculated by the depression force calculation unit and the variation speed predicted by the depression force prediction unit exceeds a prescribed value determined from the limit value, reduce the increase rate of the regenerative braking torque such that the variation speed difference falls to or below the prescribed value.

5. A control method for a braking control device having a frictional braking device configured to apply a frictional braking torque to a vehicle wheel in response to movement of an input member of a brake pedal, an electric motor configured to apply a regenerative braking torque to the vehicle wheel, a charging device configured to be charged with regenerative power generated by the electric motor, and a detection unit configured to detect a displacement amount of the input member, comprising:
determining a required braking torque of a driver on the basis of the displacement amount detected by the detection unit;
allocating the required braking torque to the regenerative braking torque and the frictional braking torque;
increasing the regenerative braking torque generated by the electric motor by a predetermined increase rate so as to realize the allocated regenerative braking torque;
calculating a limit value of the regenerative braking torque that can be generated in accordance with an operating condition of the charging device or the electric motor, wherein calculating the limit value of the regenerative braking torque comprises
determining an upper limit value of the regenerative braking torque on the basis of the required braking torque of the driver,
calculating the limit value of the regenerative braking torque on the basis of condition information indicating the operating condition of the charging device or the electric motor, and
calculating a subtracted value obtained by subtracting a prescribed value for reducing the proportion of the regenerative braking torque in advance from the calculated limit value as a modification threshold of the proportion; and
correcting the increase rate of the regenerative braking torque generated by the electric motor to be smaller than the predetermined increase rate so as to reduce a proportion of the regenerative braking torque in the required braking torque after the detection unit detects the displacement amount of the input member and before the regenerative braking torque generated by the electric motor reaches the calculated limit value, wherein
when the upper limit value is smaller than the modification threshold, the proportion of the regenerative braking torque in the required braking torque is maintained, and when the upper limit value exceeds the modification threshold, the regenerative braking torque is limited by increasing the proportion of the frictional braking torque in the required braking torque.

* * * * *